(12) United States Patent
Asakura et al.

(10) Patent No.: US 11,416,191 B2
(45) Date of Patent: Aug. 16, 2022

(54) FUNCTION EXECUTING DEVICE FOR EXECUTING COMMUNICATION OF FUNCTION EXECUTION INFORMATION WITH TERMINAL DEVICE

(71) Applicant: BROTHER KOGYO KABUSHIKI KAISHA, Nagoya (JP)

(72) Inventors: Hirotaka Asakura, Nagoya (JP); Takuya Inoue, Nisshin (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 149 days.

(21) Appl. No.: 16/750,196

(22) Filed: Jan. 23, 2020

(65) Prior Publication Data
US 2020/0257480 A1    Aug. 13, 2020

(30) Foreign Application Priority Data

Feb. 13, 2019  (JP) .............................. JP2019-023925
Feb. 13, 2019  (JP) .............................. JP2019-023930

(51) Int. Cl.
*G06F 3/12*    (2006.01)
*H04N 1/44*    (2006.01)

(52) U.S. Cl.
CPC .......... *G06F 3/1236* (2013.01); *G06F 3/1222* (2013.01); *G06F 3/1232* (2013.01);
(Continued)

(58) Field of Classification Search
CPC .... G06F 3/1236; G06F 3/1238; G06F 3/1292; H04N 1/4406
See application file for complete search history.

(56) References Cited

U.S. PATENT DOCUMENTS

2013/0083358 A1*  4/2013  Suzuki .................. G06F 3/1204
358/1.15
2013/0260683 A1* 10/2013  Suzuki .................. H04W 76/11
455/41.1
(Continued)

FOREIGN PATENT DOCUMENTS

JP      2007-068035 A    3/2007
JP      2016-225949 A   12/2016
(Continued)

OTHER PUBLICATIONS

Bluetooth Core Specification Version 4.2, published Dec. 2, 2014, pp. 1-2772.
(Continued)

*Primary Examiner* — Nicholas Pachol
(74) *Attorney, Agent, or Firm* — Scully Scott Murphy and Presser

(57) ABSTRACT

A function executing device may send screen display information to a terminal device via a first wireless interface without executing, via the first wireless interface, communication using specific authentication information, wherein the screen display information is for causing the terminal device to display a function screen. In a case where a first execution instruction for causing the function executing device to execute a first function is inputted to the terminal device after a function screen has been displayed in the terminal device, the function executing device may execute the communication using the specific authentication information with the terminal device via the first wireless interface and execute communication of first function execution information for executing the first function via the first wireless interface with the terminal device.

24 Claims, 18 Drawing Sheets

(52) U.S. Cl.
CPC .......... *G06F 3/1238* (2013.01); *G06F 3/1292* (2013.01); *H04N 1/4406* (2013.01)

(56) References Cited

U.S. PATENT DOCUMENTS

| | | | | |
|---|---|---|---|---|
| 2014/0063537 A1* | 3/2014 | Nishikawa | ............... | H04L 69/18 |
| | | | | 358/1.15 |
| 2014/0085675 A1* | 3/2014 | Watanabe | .......... | H04N 1/32786 |
| | | | | 358/1.15 |
| 2014/0085676 A1* | 3/2014 | Kishimoto | ......... | H04N 1/32641 |
| | | | | 358/1.15 |
| 2014/0118769 A1* | 5/2014 | Adachi | .............. | H04N 1/32797 |
| | | | | 358/1.13 |
| 2014/0153017 A1* | 6/2014 | Watanabe | .......... | H04N 1/00095 |
| | | | | 358/1.13 |
| 2014/0293327 A1* | 10/2014 | Miyazaki | .............. | H04W 84/12 |
| | | | | 358/1.15 |
| 2014/0293332 A1* | 10/2014 | Urakawa | ............... | G06F 3/1212 |
| | | | | 358/1.15 |
| 2015/0002875 A1* | 1/2015 | Asai | ................... | H04N 1/00342 |
| | | | | 358/1.13 |
| 2015/0009532 A1* | 1/2015 | Tsugimura | ............ | G06F 3/1203 |
| | | | | 358/1.15 |
| 2015/0355875 A1* | 12/2015 | Matsushita | ........... | G06F 3/1236 |
| | | | | 358/1.15 |
| 2016/0182757 A1* | 6/2016 | Yoo | .................... | H04N 1/00307 |
| | | | | 358/1.15 |
| 2016/0360484 A1 | 12/2016 | Moritomo | | |
| 2017/0085694 A1 | 3/2017 | Shibao | | |
| 2017/0134609 A1* | 5/2017 | Park | .................... | H04N 1/32117 |
| 2017/0280492 A1* | 9/2017 | Kurihara | ............. | H04L 61/2007 |
| 2017/0286028 A1 | 10/2017 | Yang et al. | | |
| 2018/0024784 A1* | 1/2018 | Watanabe | ............. | G06F 3/1205 |
| | | | | 709/205 |
| 2018/0263078 A1* | 9/2018 | Asakura | ................ | H04W 8/005 |
| 2018/0285035 A1* | 10/2018 | Asakura | ................ | H04W 48/16 |

FOREIGN PATENT DOCUMENTS

| | | |
|---|---|---|
| JP | 2017-059063 A | 3/2017 |
| JP | 2017-182489 A | 10/2017 |
| JP | 2018-014006 A | 1/2018 |

OTHER PUBLICATIONS

Bluetooth Core Specification Version 5.0, published Dec. 6, 2016, pp. 1-2822.
Wi-Fi Peer-to-Peer (P2P) Technical Specification Version 1.1 (2010), pp. 1-159.

* cited by examiner

FIG. 3

(Data Structure of Primary Service Group)

| | Handle | Attribute Type | Attribute Value | Attribute Permission |
|---|---|---|---|---|
| First Type of Primary Service (138A) | 0x0001 | 0x2800 | "0x1800" (GAP Service) | Readable without authentication |
| | 0x0002 | 0x2803 | Read, Handle:n1, UUID:0x2A00, | Readable without authentication |
| | ... | ... | ... | ... |
| | n1 | 0x2A00 (Device Name) | Device Name DN | Readable without authentication when discoverable |
| | ... | ... | ... | ... |
| Second Type of Primary Service (138B) | n2 | 0x2800 | "aaa0" (Function Service) | Readable without authentication |
| | n3 | 0x2803 | Read, Handle:n4, UUID:aaa1 | Readable without authentication |
| | n4 | aaa1 (Function Information) | Function Information FI | Readable without authentication |

FIG. 4

(Data Structure of Primary Service Group (Continuation of FIG. 3))

Second Type of Primary Service 138C

| Handle | Attribute Type | Attribute Value | Attribute Permission |
|---|---|---|---|
| n5 | 0x2800 | UUID "bbb0" (AP Connection) | Readable without authentication |
| n6 | 0x2803 | Read, Handle:n10, UUID:bbb1 | Readable without authentication |
| n7 | 0x2803 | Read, Handle:n11, UUID:bbb2 | Readable without authentication |
| n8 | 0x2803 | Write, Handle:n12, UUID:bbb3 | Readable without authentication |
| n9 | 0x2803 | Write, Handle:n13, UUID:bbb4 | Readable without authentication |
| n10 | bbb1 (Connection Status) | AP State Information (Disable, Enable, Busy or Error) | Readable without authentication |
| n11 | bbb2 (IP Address) | IP Address IA | Readable without authentication |
| n12 | bbb3 (Connection formation) | SSID and Password | Readable without authentication |
| n13 | bbb4 (Change Permission) | Permission Change Instruction | Readable without authentication |

FIG. 5

(Data Structure of Primary Service Group (Continuation of FIG. 4))
Second Type of Primary Service

| Handle | Attribute Type | Attribute Value | Attribute Permission |
|---|---|---|---|
| n14 | 0x2800 | "ccc0" (WFD Connection) | Readable without authentication |
| n15 | 0x2803 | Read, Handle:n19, UUID:ccc1 | Readable without authentication |
| n16 | 0x2803 | Read, Handle:n20, UUID:ccc2 | Readable without authentication |
| n17 | 0x2803 | Write, Handle:n21, UUID:ccc3 | Readable without authentication |
| n18 | 0x2803 | Write, Handle:n22, UUID:ccc4 | Readable without authentication |
| n19 | ccc1 (Connection Status) | WFD State Information (Disable, Enable, Ready, Start or Error) | Readable without authentication |
| n20 | ccc2 (Connection Information) | Encrypted WFD Information or Empty Information | Readable without authentication |
| n21 | ccc3 (Public Key) | Public Key | Writeable without authentication |
| n22 | ccc4 (Change Status) | Enable Instruction, Start Instruction etc. | Writeable without authentication |
| n23 | 0x2800 | "ddd0" (BT Control) | Readable without authentication |
| n24 | 0x2803 | Write, Handle:n26, UUID:ddd1 | Readable without authentication |
| n25 | 0x2803 | Write, Handle:n27, UUID:ddd2 | Readable without authentication |
| n26 | ddd1 (Pairing Control) | Disconnection Instruction | Writeable without authentication |
| n27 | ddd2 (Advertising Control) | Resume Flag OFF Instruction | Writeable without authentication |
| n28 | 0x2800 | "eee0" (Error Service) | Readable without authentication |
| n29 | 0x2803 | Read, Handle:n30, UUID:eee1 | Readable without authentication |
| n30 | eee1 (Connection Information) | Error URL or Empty Information | Readable without authentication |

138D spans n14–n22
138E spans n23–n27
138F spans n28–n30

FUNCTION EXECUTING DEVICE FOR EXECUTING COMMUNICATION OF FUNCTION EXECUTION INFORMATION WITH TERMINAL DEVICE

CROSS-REFERENCE TO RELATED APPLICATION

This application claims priority to Japanese Patent Application No. 2019-023925 filed on Feb. 13, 2019 and Japanese Patent Application No. 2019-023930 filed on Feb. 13, 2019, the contents of which are hereby incorporated by reference into the present application.

TECHNICAL FIELD

The disclosure herein discloses a technique relating to a device capable of executing communication in which specific authentication information is used.

DESCRIPTION OF RELATED ART

A communication device that executes pairing with an information processing device in accordance with BLE (Bluetooth (registered trademark) Low Energy) standard is known. In response to receiving a pairing request from the information processing device, the communication device displays a PIN (Personal Identification Number) code for using GATT (Generic Attribute Profile) communication. In a case where the displayed PIN code is inputted to the information processing device, the communication device receives the PIN code from the information processing device. Thereby, authentication of the PIN code is executed such that the GA n communication can be used. By using the GATT communication, the communication device supplies a list of services supported by the communication device to the information processing device. In order to provide a remote UI service included in the list, the information processing device uses the GATT communication to send a password to the communication device. In a case where the information processing device receives an access permission response as a response to the password from the communication device, the information processing device displays the remote UI.

SUMMARY

In the above-described technique, the authentication of the PIN code is executed, for example, even in a case where a service desired by a user is not included in the services supported by the communication device. The disclosure herein provides a novel technique for addressing problems in the above-described technique.

A function executing device disclosed herein may comprise: a first wireless interface; a processor; and a storage storing computer-readable instructions, wherein the computer-readable instructions, when executed by the processor, may cause the function executing device to: establish a first wireless connection with a terminal device via the first wireless interface; send screen display information to the terminal device via the first wireless interface by using the first wireless connection without executing, via the first wireless interface, communication using specific authentication information that is prepared by one device among the function executing device and the terminal device, wherein the screen display information is for causing the terminal device to display a function screen indicating one or more functions that the function executing device is capable of executing; in a case where a first execution instruction for causing the function executing device to execute a first function is inputted to the terminal device after the function screen has been displayed in the terminal device, establish a second wireless connection with the terminal device via the first wireless interface; execute the communication using the specific authentication information with the terminal device via the first wireless interface by using the second wireless connection; and after the communication using the specific authentication information has been executed, execute communication of first function execution information for executing the first function via the first wireless interface with the terminal device.

A non-transitory computer-readable medium storing computer-readable instructions for a terminal device is disclosed herein. The computer-readable instructions, when executed by a processor of the terminal device, may cause the terminal device to: supply a first command to an Operating System (OS) program of the terminal device, the first command being for establishing a first wireless connection with a function executing device via a first wireless interface of the terminal device; receive screen display information from the function executing device via the first wireless interface by using the first wireless connection without executing, via the first wireless interface, communication using specific authentication information prepared by one device among the function executing device and the terminal device, wherein the screen display information is for causing the terminal device to display a function screen indicating one or more functions that the function executing device is capable of executing; in a case where the screen display information is received from the function executing device, cause a display unit of the terminal device to display the function screen; in a case where a first execution instruction for causing the function executing device to execute a first function is inputted to the terminal device after the function screen has been displayed in the display unit, supply a second command to the OS program, the second command being for establishing a second wireless connection with the function executing device via the first wireless interface; and after the communication using the specific authentication information has been executed with the function executing device via the first wireless interface by using the second wireless connection, execute communication of first function execution information for executing the first function via the first wireless interface with the function executing device.

Another function executing device disclosed herein may comprise: a first wireless interface; a processor; and a storage storing computer-readable instructions, wherein the computer-readable instructions, when executed by the processor, may cause the function executing device to: send screen display information to a terminal device via the first wireless interface without executing a target process using specific authentication information that is prepared by one device among the function executing device and the terminal device, wherein the screen display information is for causing the terminal device to display a function screen indicating one or more functions that the function executing device is capable of executing; in a case where a first execution instruction for causing the function executing device to execute a first function is inputted to the terminal device after the function screen has been displayed in the terminal device, establish a first wireless connection with the terminal device via the first wireless interface; receive an execution request from the terminal device via the first wireless interface by using the first wireless connection without executing the target process using the specific authentication information, the execution request being for causing the function executing device to execute the target process using the specific authentication information; execute the target process using the specific authentication information in response to receiving the execution request from the terminal device; and after the target process using the specific authentication information has been executed, execute communication of first function execution information for executing the first function via the first wireless interface with the terminal device.

Another non-transitory computer-readable medium storing computer-readable instructions for a terminal device is disclosed herein. The computer-readable instructions, when executed by a processor of the terminal device, causing the terminal device to: receive screen display information from a function executing device via a first wireless interface of the terminal device without executing a target process using specific authentication information that is prepared by one device among the function executing device and the terminal device, wherein the screen display information is for causing the terminal device to display a function screen indicating one or more functions that the function executing device is capable of executing; in a case where the screen display information is received from the function executing device, cause a display unit of the terminal device to display the function screen; in a case where a first execution instruction for causing the function executing device to execute a first function is inputted to the terminal device after the function screen has been displayed in the display unit, supply a command to an Operating System (OS) program of the terminal device, wherein the command is for establishing a first wireless connection with the function executing device via the first wireless interface; send an execution request to the function executing device via the first wireless interface by using the first wireless connection, the execution request being for causing the function executing device to execute the target process using the specific authentication information; and after the target process using the specific authentication information has been executed, execute communication of first function execution information for executing the first function via the first wireless interface with the function executing device.

A computer program for implementation of the above function executing device, a non-transitory computer-readable medium storing the computer program and a method implemented by the above function executing device are also novel and useful. A computer program for implementation of the above terminal device, the terminal device itself and a method implemented by the above terminal device are also novel and useful.

BRIEF DESCRIPTION OF THE DRAWINGS

FIG. 3 shows a data structure of the Primary Service group;
FIG. 4 shows a continuation of FIG. 3;
FIG. 5 shows a continuation of FIG. 4.

EMBODIMENTS

Figure 1:
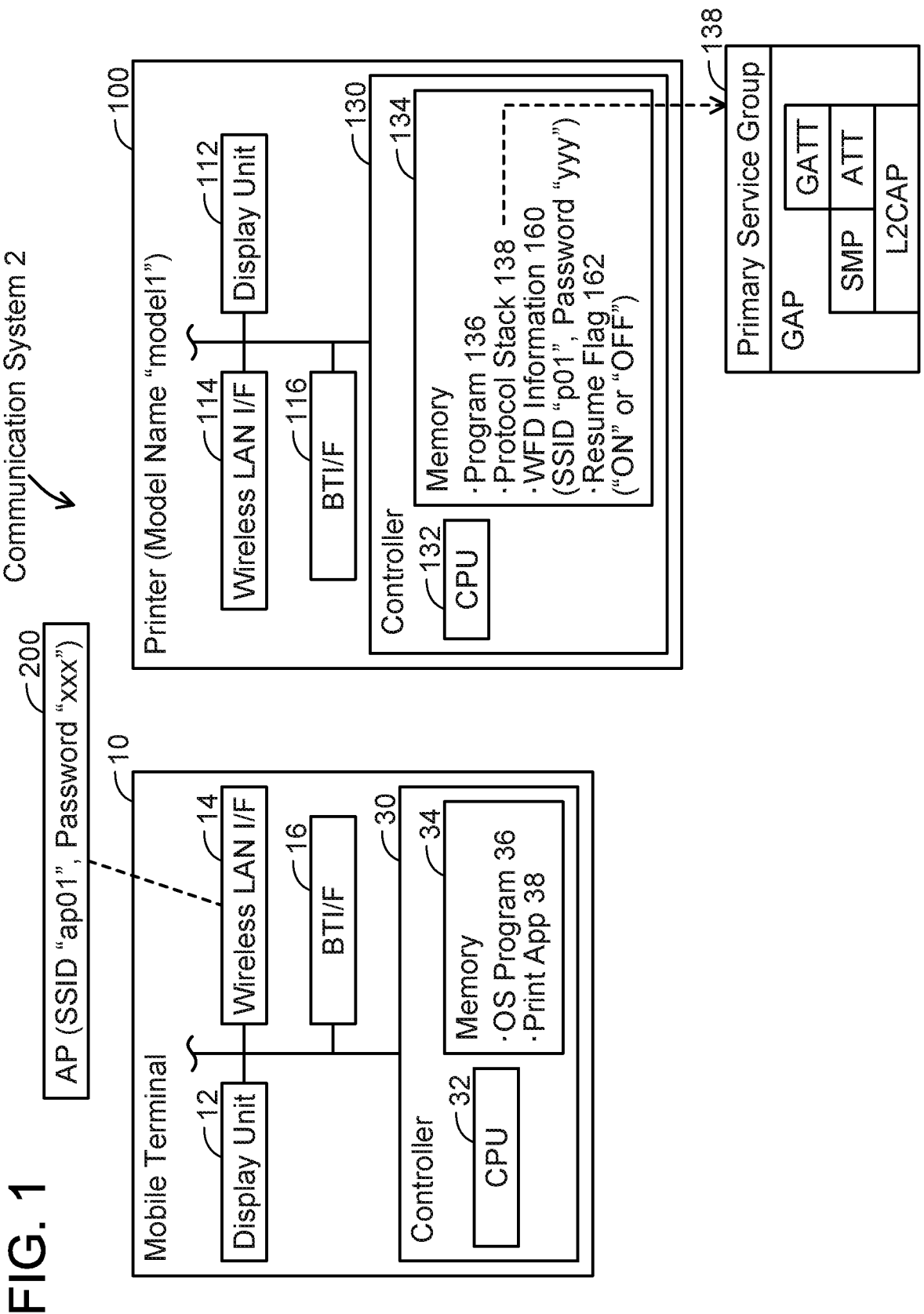
FIG. 1 shows a configuration of a communication system.

First Embodiment (Configuration of Communication System 2; FIG. 1)

As shown in FIG. 1, a communication system 2 comprises a portable terminal 10 (hereinbelow simply termed "terminal 10"), a printer 100, and an AP (Access Point) 200. The terminal 10 is participating in a wireless network formed by the AP 200 (hereinbelow termed "AP network"). The AP 200 stores an SSID (Service Set Identifier) "ap01" for identifying the AP network, and a password "xxx" used in the AP network.

(Configuration of Terminal 10)

The terminal 10 is a portable terminal device such as a cellphone (e.g., a smartphone), a PDA, a tablet PC, etc. The terminal 10 comprises a display unit 12, a wireless LAN interface 14, a BT (Bluetooth (registered trademark)) interface 16, and a controller 30. The units 12 to 30 are connected to a bus line (reference number omitted). Hereinbelow, an interface will be simply termed "I/F".

The display unit 12 is a display for displaying various types of information. The display unit 12 also functions as a touch panel (i.e., operation unit) which receives instructions from a user.

The wireless LAN I/F 14 is a wireless interface configured to execute wireless communication according to a Wi-Fi scheme (hereinbelow termed "Wi-Fi communication"). The Wi-Fi scheme is a wireless communication scheme for executing wireless communication according to 802.11 standard of IEEE (The Institute of Electrical and Electronics Engineers, inc.) and standards complying thereto (such as 802.11a, 11b, 11g, 11n, 11ac, etc.). The wireless LAN I/F 14 especially supports WFD (Wi-Fi Direct (registered trademark)) scheme established by the Wi-Fi Alliance. The WFD scheme is a wireless communication scheme described in the standard "Wi-Fi Peer-to-Peer (P2P) Technical Specification Version1.1" created by the Wi-Fi Alliance.

The terminal 10 can operate in any of G/O (Group Owner) state, CL (Client) state, and device state of the WFD scheme. For example, the terminal 10 can operate as a client of the WFD scheme and participate as a child station in a wireless network (hereinbelow termed "WFD network") formed by an external device (e.g., the printer 100) operating as a G/O of the WFD scheme.

The BT I/F 16 is an I/F configured to execute wireless communication according to a BT scheme. The BT scheme is a wireless communication scheme based on, for example, 802.15.1 standard of the IEEE and standards complying thereto. More specifically, the BT I/F 16 supports BLE (Bluetooth Low Energy). The BLE is a standard implemented in version 4.0 and later versions of the BT scheme. In the present embodiment, it is assumed that the BT I/F 16 supports BLE implemented in version 4.2. The BT I/F 16 is capable of executing wireless communication according to the BLE (hereinbelow termed "BLE communication"). In a variant, the BT I/F 16 may support BLE implemented in version 4.2 or a later version (e.g., 5.0).

Differences between the Wi-Fi scheme and the BT scheme will be described. A communication speed of Wi-Fi communication (e.g., maximum communication speed is 600 Mbps) is faster than a communication speed of BT communication (e.g., maximum communication speed is 24 Mbps). A carrier wave frequency in the Wi-Fi communication is a 2.4 GHz band or 5.0 GHz band. A carrier wave frequency in the BT communication is 2.4 GHz band. That is, in a case where the 5.0 GHz band is adopted as the carrier wave frequency in the Wi-Fi communication, the carrier wave frequency in the Wi-Fi communication is different from the carrier wave frequency in the BT communication. Further, a maximum distance with which the Wi-Fi communication can be executed (e.g., approximately 100 m) is greater than a maximum distance with which the BT communication can be executed (e.g., approximately several tens of meters).

The controller 30 comprises a CPU 32 and a memory 34. The CPU 32 is configured to execute various processes in accordance with programs 36, 38 stored in the memory 34. The memory 34 is constituted of a volatile memory, a non-volatile memory and the like, and stores the OS (Operating System) program 36 (hereinbelow simply termed "OS 36") and the print application 38 (hereinbelow simply termed "app 38"). In the present embodiment, it is assumed that the OS 36 is iOS (registered trademark).

The OS 36 is a program for controlling basic operations of the terminal 10. The app 38 is an application for sending print data to the printer 100 by using a wireless connection according to the Wi-Fi scheme. The app 38 may be installed in the terminal 10, for example, from a server on the Internet provided by a vendor of the printer 100, or may be installed in the terminal 10 from a medium shipped together with the printer 100.

(Configuration of Printer 100)

The printer 100 is a peripheral device (e.g., a peripheral device of the terminal 10) capable of executing a print function. The printer 100 comprises a display unit 112, a wireless LAN I/F 114, a BT I/F 116, and a controller 130.

The display unit 112 is a display for displaying various types of information. The display unit 112 also functions as a touch panel (i.e., operation unit) which receives instructions from the user. The wireless LAN I/F 114 is the same as the wireless LAN I/F 14 of the terminal 10. That is, the wireless LAN I/F 114 supports the WFD scheme. The BT I/F 116 is the same as the BT I/F 16 of the terminal 10. That is, the BT I/F 116 supports the BLE.

The controller 130 comprises a CPU 132 and a memory 134. The CPU 132 is configured to execute various processes in accordance with a program 136 stored in the memory 134. The memory 134 is constituted of a volatile memory, a non-volatile memory and the like, and stores a protocol stack 138, WFD information 160, and a resume flag 162, in addition to the program 136.

The protocol stack 138 includes a protocol stack according to the BLE. The printer 100 uses the protocol stack 138 to operate as a server of the BT scheme, and can thereby execute BLE communication with the terminal 10 that is operating as a client of the BT scheme.

The protocol stack 138 has a hierarchical structure shown in FIG. 1. L2CAP (Logical Link Control and Application Protocol) is a stack for establishing a wireless connection (hereinbelow termed "L2CAP Link") via the BT I/F 116. SMP (Security Manager Protocol) and ATT (Attribute Protocol) are upper layers of the L2CAP. The SMP is a protocol for encrypting information communicated via the L2CAP Link. The ATT is a protocol for defining an access scheme between a server and a client in communication via the L2CAP Link. GATT (Generic Attribute Profile) is an upper layer of the ATT and is a protocol for defining functions of the server and the client. GAP (Generic Access Profile) is an upper layer of the L2CAP, SMP, ATT, and GATT and is a protocol for defining a function shared among devices capable of executing BLE communication. A Primary Service group is an upper layer of the GAP and is an application for defining specific operations relating to BLE communication. Below, Primary Service is simply termed "PS".

The WFD information 160 is information used for establishing a wireless connection according to the WFD scheme (hereinbelow termed "WFD connection"). The WFD information 160 includes an SSID "p01" for identifying a WFD network formed by the printer 100 that is operating as a G/O, and a password "yyy" used in this WFD network. The WFD information 160 may be stored in advance in the memory 134 at a shipping stage of the printer 100, or may be created when power of the printer 100 is turned on.

The resume flag 162 indicates either one of "ON", which indicates that sending of an Advertise signal (hereinbelow simply termed "ADV signal") according to the BT scheme is resumed immediately after it is stopped, and "OFF", which indicates that sending of the ADV signal is not resumed immediately after it is stopped. The resume flag 162 is set to "ON" when the power of the printer 100 is turned on.

Figure 2:
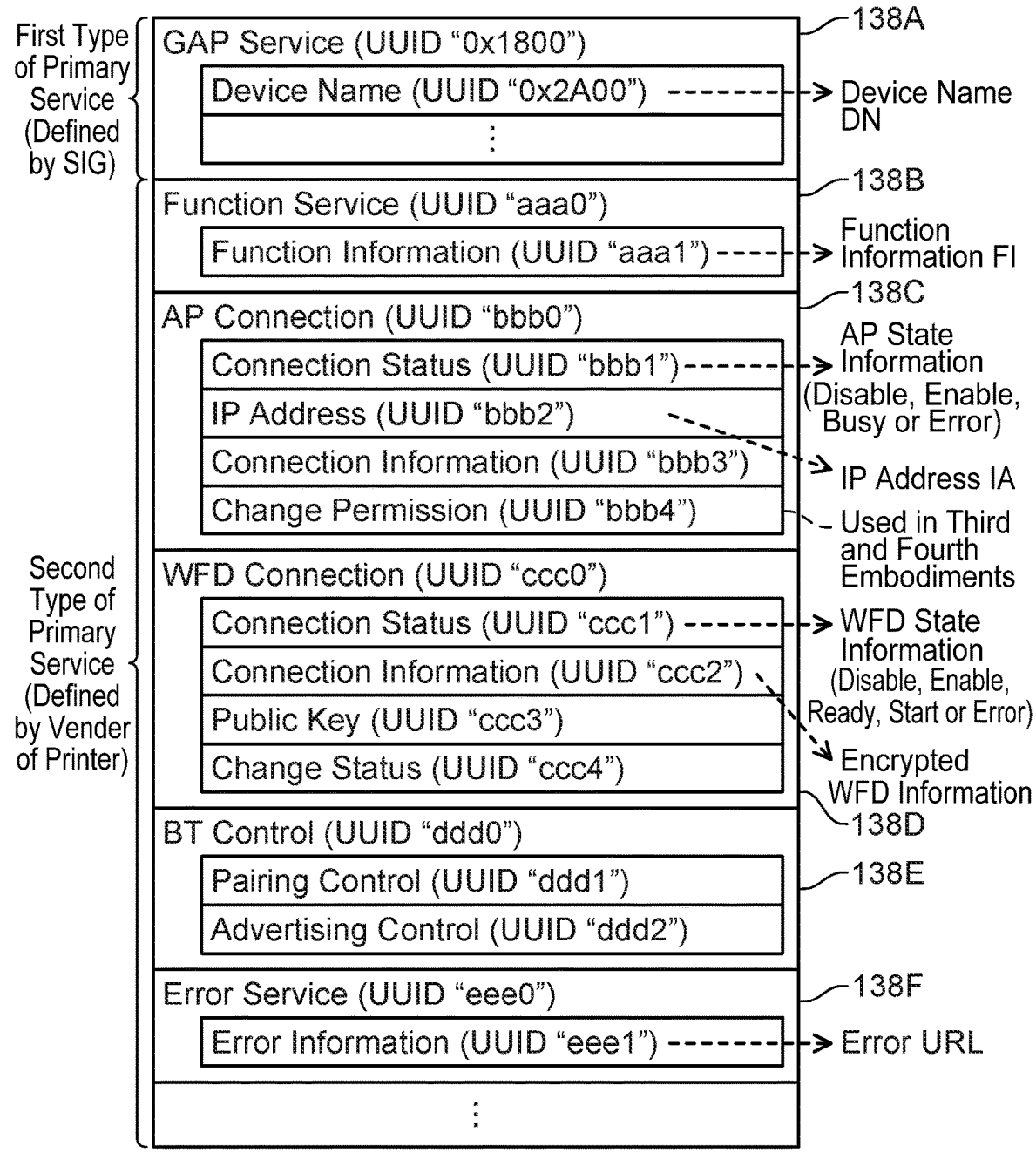
FIG. 2 shows a conceptual diagram of a Primary Service group.

(Concept of PS Group; FIG. 2)

The concept of the PS group included in the protocol stack 138 will be described with reference to FIG. 2. A table of FIG. 2 shows the PS group conceptually for ease of understanding, and is different from the specific data structure of the PS group. The data structure of the PS group will be described with reference to FIG. 3 to FIG. 5 after explanation as to FIG. 2 has finished. The PS group is divided into a first type of PS defined by Bluetooth SIG (that is, predetermined by the BT scheme standard), and a second type of PS defined by the vendor of the printer 100.

(First Type of PS)

The first type of PS includes GAP Service 138A. Hereinbelow, GAP Service is simply termed "GA". The GA 138A is a PS for sending information related to the BT I/F 116. This information includes, for example, a device name DN indicating the BT I/F 116, information indicating a standard supported by the BT I/F 116, etc. A UUID "0x1800" that is predetermined by the BT scheme standard as an identifier for identifying a PS corresponding to the GA is assigned to the GA 138A. The GA 138A includes a plurality of Characteristics. The Characteristics are information defining specific functions of the PS. The plurality of Characteristics included in the GA 138A includes a Characteristic "Device Name" that defines sending of the device name DN. A UUID "0x2A00" predetermined by the BT scheme standard as an identifier for identifying this Characteristic is assigned to "Device Name". In FIG. 2, depiction of other Characteristics included in the GA 138A is omitted.

(Second Type of PS)

The second type of PS includes a Function Service 138B, an AP Connection 138C, a WFD Connection 138D, a BT Control 138E, and an Error Service 138F.

(Function Service 138B)

Hereinbelow, Function Service is simply termed "FS". The FS 138B is a PS for sending function information FI that indicates a plurality of functions the printer 100 is capable of executing. The function information FI includes information indicating the print function, information indicating a function of establishing a wireless connection with an AP (e.g., the AP 200) (hereinbelow termed "AP connection"), information indicating a function of establishing a WFD connection, and information indicating a function of sending an error URL. A UUID "aaa0" determined by the vendor of the printer 100 as an identifier for identifying the PS corresponding to the FS is assigned to the FS 138B. UUIDs for identifying the second type of PS, which will be described below, are also determined by the vendor of the printer 100. The UUID "aaa0" has the greater number of digits than a UUID predetermined by the BT scheme standard (e.g., the UUID "0x1800"), but is simplified in the present disclosure.

The FS 138B includes a Characteristic "Function Information" that defines sending of the function information FI. A UUID "aaa1" determined by the vendor of the printer 100 as an identifier for identifying this Characteristic is assigned to the "Function Information". UUIDs for identifying Characteristics included in the second type of PS are also determined by the vendor of the printer 100.

(AP Connection 138C)

Hereinbelow, AP Connection is simply termed "AC". The AC 138C is a PS for establishing an AP connection. A UUID "bbb0" is assigned to the AC 138C. The AC 138C includes four Characteristics including "Connection Status", "IP Address", "Connection Information", and "Change Permission".

"Connection Status" is a Characteristic (UUID "bbb1") that defines sending of AP state information that indicates a state of the printer 100 relating to an AP connection. The AP state information indicates any one of a plurality of states including "Disable", "Enable", "Busy", and "Error". "Disable" indicates that the printer 100 is set in a state that does not allow establishment of an AP connection. "Enable" indicates that the printer 100 is set in a state that allows establishment of an AP connection. "Busy" indicates that a process for establishing an AP connection is being executed. "Error" indicates that the process for establishing an AP connection has failed.

"IP Address" is a Characteristic (UUID "bbb2") that defines sending of an IP address IA of the printer 100.

"Connection Information" is a Characteristic (UUID "bbb3") that defines reception of an SSID and a password of an AP (e.g., the AP 200) with which a communication partner (e.g., the terminal 10) is establishing a wireless connection.

"Change Permission" is a Characteristic (UUID "bbb4") that defines reception of an instruction for changing a value of Attribute Permission, which will be described later. The Change Permission is used in the third and fourth embodiments, and is not used in the first and second embodiments.

(WFD Connection 138D)

Hereinbelow, WFD Connection is simply termed "WC". The WC 138D is a PS (UUID "ccc0") for establishing a WFD connection. The WC 138D includes four Characteristics including "Connection Status", "Connection Information", "Public Key", and "Change Status".

"Connection Status" is a Characteristic (UUID "ccc1") that defines sending of WFD state information that indicates a state of the printer 100 relating to a WFD connection. The WFD state information indicates any one of a plurality of states including "Disable", "Enable", "Ready", "Start", and "Error". "Disable" indicates that the printer 100 is set in a state that does not allow establishment of a WFD connection. "Enable" indicates that the printer 100 is set in a state that allows establishment of a WFD connection. "Ready" indicates that a process of encrypting the WFD information 160 by using a public key has completed. "Start" indicates that the printer 100 has started operating as the G/O. "Error" indicates that a process for establishing a WFD connection has failed.

"Connection Information" is a Characteristic (UUID "ccc2") that defines sending of WFD information encrypted by using a public key (hereinbelow termed "encrypted WFD information").

"Public Key" is a Characteristic (UUID "ccc3") that defines reception of a public key.

"Change Status" is a Characteristic (UUID "ccc4") that defines reception of an instruction for changing the state of the printer 100 relating to a WFD connection (e.g., an instruction for causing the printer 100 to operate as the G/O).

(BT Control 138E)

Hereinbelow, BT Control is simply termed "BC". The BC 138E is a PS (UUID "ddd0") for receiving an instruction for changing a state of the BT I/F 116. The BC 138E includes two Characteristics including "Pairing Control" and "Advertising Control".

"Pairing Control" is a Characteristic (UUID "ddd1") that defines reception of an instruction for disconnecting an L2CAP Link that has been established.

"Advertising Control" is a Characteristic (UUID "ddd2") that defines reception of an instruction for changing the resume flag 162 from "ON" to "OFF".

(Error Service 138F)

Hereinbelow, Error Service is simply termed "ES". The ES 138F is a PS (UUID "eee0") for sending an error URL. The error URL is a URL indicating a Web page that describes a method of resolving an error state in which the printer 100 cannot execute the print function (e.g., paper jam). The ES 138F includes a Characteristic "Error Information (UUID "eee1")" that defines sending of such an error URL.

(Data Structure of PS Group; FIG. 3 to FIG. 5)

The concept of the PS group was described with reference to FIG. 2. Next, a specific data structure of the PS group will be described with reference to FIG. 3 to FIG. 5.

The PS group has a table structure in which Handles, Attribute Types, Attribute Values, and Attribute Permissions are associated with each other. The Handles are serial numbers starting from "0x0001". In FIG. 3 to FIG. 5, some data structure after "0x0002" is omitted. For this reason, the Handles after "0x0002" are represented not in actual values, but in symbols "nk (k=1, 2, 3 . . . )". The Attribute Types (hereinbelow simply termed "ATypes") are identifiers (that is, UUIDs) indicating types of communication target information. The Attribute Values (hereinbelow simply termed "AValues") indicate the communication target information. The Attribute Permissions (hereinbelow simply termed "APers") are items related to the SMP, more specifically, indicate permission conditions for readout and/or writing of information.

Specifically, each of the APers stores values each indicating the following four items. The first item is an item that indicates whether to permit readout and/or writing of information, and each Aper stores one value that indicates any one of "Readable", "Writeable", and "Readable and writeable". The second item is an item that indicates whether Encryption is required or not when the readout or writing of information is executed, and each Aper stores one value that indicates any one of "Encryption required" and "No encryption required". The third item is an item that indicates whether Authentication is required or not when the readout or writing of information is executed, and each Aper stores one value that indicates any one of "Authentication required" and "No authentication required". The fourth item is an item that indicates whether Authorization is required or not when the readout or writing of information is executed, and each Aper stores one value that indicates any one of "Authorization required" and "No authorization required". In a case where a value indicating any one of "Encryption required", "Authentication required", and "Authorization required" is stored in the APer, readout and/or writing of information is permitted on condition that authentication communication according to the SMP is executed. Further, in a case where a value indicating "No encryption required", "No authentication required" and "No authorization required" is stored in the APer, readout and/or writing of information is permitted without execution of authentication communication according to the SMP. It should be noted that FIG. 3 to FIG. 5 show these values in a simplified manner. For example, in a case where the APer indicates "Readable without authentication", this Aper actually stores the value indicating "Readable" as the aforementioned first item and the value indicating "No authentication required" as the aforementioned third item. It should be further noted that the APers in FIG. 3 to FIG. 5 omit the second item and the fourth item. Actually, each of the Apers stores the value indicating "No encryption required" as the aforementioned second item and the value indicating "No authorization required" as the aforementioned fourth item. In the following description, unless otherwise specifically mentioned, each of the Apers stores the value indicating "No encryption required" as the second item and the value indicating "No authorization required" as the fourth item. In a case where the APer stores values indicating "Readable without authentication when discoverable", this Aper stores the value indicating "Readable" as the first item, the value indicating "No authentication required" as the third item, and the value indicating "No authorization required" as the fourth item, and additionally, in a case where a condition that the state of the server is a Discoverable state (that is, "when discoverable") (to be described later) is satisfied, this APer further stores a value that indicates readout of information is permitted without executing authentication communication according to the SMP, in accordance with "No authentication required" and "No authorization required". As described above, it should be noted that the descriptions of APers in the drawings do not completely match the actual items described in the Bluetooth SIG standard, but they merely conceptually indicate the conditions related to the SMP.

(First Type of PS)

(GAP Service (GA) 138A) The GA 138A is a data group corresponding to the Handle range of "0x0001" to a predetermined value (a value immediately before "n2"). The AType corresponding to the Handle "0x0001" includes a UUID "0x2800" indicating that it is the first data in a data group constituting one PS. The AValue corresponding to the Handle "0x0001" includes the UUID "0x1800" for distinguishing the GA 138A from the other PSs. The APer corresponding to the Handle "0x0001" includes values indicating "Readable without authentication". These values mean that information can be read out without encryption of the information according to the SMP.

The AType corresponding to the Handle "0x0002" includes a UUID "0x2803" indicating a Characteristic Declaration. A Characteristic Declaration is data that defines a property, a UUID, and the like of a Characteristic. Here, the property indicates any one of plural pieces of information including "Read" which indicates that the Characteristic defines information to be read out, "Write" which indicates that the Characteristic defines information to be written, and the like. The AValue corresponding to the Handle "0x0002" includes a property indicating "Read", a Handle "n1" corresponding to information of the Characteristic, and the UUID "0x2A00" of the Characteristic. The APer corresponding to the Handle "0x0002" includes values indicating "Readable without authentication".

The AType corresponding to the Handle "n1" includes the UUID "0x2A00" of the Characteristic "Device Name". The AValue corresponding to the Handle "n1" includes the device name DN. The APer corresponding to the Handle "n1" includes values indicating "Readable without authentication when discoverable". These values mean that in a case where the state of a peripheral (that is, the printer 100) of the BT scheme is the Discoverable state, information (here, the device name DN) can be read out without encryption of the information according to the SMP. This means, in other words, that in a case where the state of the peripheral is not the Discoverable state (that is, is a non-Discoverable state), the information can be read out on condition that the information is encrypted according to the SMP. Here, the Discoverable state is a state in which the peripheral is repeatedly sending the ADV signal. In other words, the Discoverable state is a state in which a central of the BT scheme can detect the presence of the peripheral when the ADV signal is received by the central. Further, the ADV signal sent in the Discoverable state includes a predetermined value related to being in the Discoverable state. Here, the "predetermined value" is, for example, LE Limited Discoverable Mode flag "1" defined by the BT scheme standard or LE General Discoverable Mode flag "1" defined by the BT scheme standard. On the other hand, the non-Discoverable state indicates a state in which the peripheral is not sending the ADV signal, or a state in which the peripheral is repeatedly sending the ADV signal but this ADV signal does not include the aforementioned predetermined value (in other words, a state in which the ADV signal includes both LE Limited Discoverable Mode flag "0" and LE General Discoverable Mode flag "0"), "Readable without authentication when discoverable" is an item defined in the standard of version 4.2 or later. Hereinbelow, in a situation in which the ADV signal is sent, the ADV signal includes the predetermined value relating to the Discoverable state, unless otherwise mentioned.

Since the GA 138A has the above-described data structure, the device name DN in the GA 138A is read out as follows. When the CPU 132 (that is, the server) receives a Read By Type Request signal that designates the UUID "0x2803" from a client, the CPU 132 permits the client to read out the AValue corresponding to the UUID "0x2803" (that is, the property "Read", the Handle "n1", and the UUID "0x2A00") in accordance with "Readable without authentication" indicated by the APer corresponding to the UUID "0x2803". As a result, the client can read out (that is, receive) these information, and based on these information, the client can be aware that it is possible to execute "Read" for the information corresponding to the Handle "n1" and the UUID "0x2A00". Then, the client sends a Read By Type Request signal that designates the UUID "0x2A00" to the server. When the server receives this signal from the client, the server permits the client to read out the AValue corresponding to the UUID "0x2A00" (that is, the device name DN) in accordance with "Readable without authentication when discoverable" indicated by the APer corresponding to the UUID "0x2A00". Thereby, the client can read out the device name DN.

For the first type of PS, among the above items such as "Readable without authentication", items predetermined by the SIG are adopted. That is, for example, for the APer corresponding to the Handle "n1", only "Readable without authentication when discoverable" can be adopted, and the vendor of the printer 100 cannot adopt another item for it. On the other hand, for the second type of PS described below, the vendor of the printer 100 can adopt any of the above items.

(Second Type of PS)

(Function Service (FS) 138B)

The FS 138B is a data group corresponding to a Handle range of "n2" to "n4". The AType corresponding to the Handle "n2" includes the UUID "0x2800" indicating that it is the first data in the FS 138B. The AValue corresponding to the Handle "n2" includes the UUID "aaa0" for distinguishing the FS 138B from the other PSs. The APer corresponding to the Handle "n2" includes values indicating "Readable without authentication".

The AType corresponding to the Handle "n3" includes the UUID "0x2803" indicating a Characteristic Declaration. The AValue corresponding to the Handle "n3" includes the property "Read", the Handle "n4", and the UUID "aaa1". The APer corresponding to the Handle "n3" includes values indicating "Readable without authentication".

The AType corresponding to the Handle "n4" includes the UUID "aaa1" of the Characteristic "Function Information". The AValue corresponding to the Handle "n4" includes the function information FI. The APer corresponding to the Handle "n4" includes values indicating "Readable without authentication".

(AP Connection (AC) 138C)

As shown in FIG. 4, the AC 138C is a data group corresponding to a Handle range of "n5" to "n13". The AType corresponding to the Handle "n5" includes the UUID "0x2800" indicating that it is the first data in the AC 138C. The AValue corresponding to the Handle "n5" includes the UUID "bbb0" for distinguishing the AC 138O from the other PSs. The APer corresponding to the Handle "n5" includes values indicating "Readable without authentication".

Each of the ATypes corresponding to the Handles "n6" to "n9" includes the UUID "0x2803" indicating a Characteristic Declaration. The AValue corresponding to the Handle "n6" includes the property "Read", the Handle "n10", and the UUID "bbb1". Similarly, each of the AValues corresponding to the Handles "n7" to "n9" includes a property, a Handle, and a UUID. The properties corresponding to the Handles "n8" and "n9" are not "Read" but "Write". Further, each of the APers corresponding to the Handles "n6" to "n9 include values indicating "Readable without authentication".

The AType corresponding to the Handle "n10" includes the UUID "bbb1" of the Characteristic "Connection Status". The AValue corresponding to the Handle "n10" includes the AP state information (e.g., "Disable"). The APer corresponding to the Handle "n10" includes values indicating "Readable without authentication".

The AType corresponding to the Handle "n11" includes the UUID "bbb2" of the Characteristic "IP Address". The AValue corresponding to the Handle "n11" includes the IP address IA. The APer corresponding to the Handle "n11" includes values indicating "Readable without authentication".

The AType corresponding to the Handle "n12" includes the UUID "bbb3" of the Characteristic "Connection Information". An SSID and a password of an AP (e.g., 200) are to be written by the client as the AValue corresponding to the Handle "n12". Before the information is written, this AValue includes empty information (e.g. Null value). The APer corresponding to the Handle "n12" includes values indicating "Writeable without authentication". These values mean that information (here, the SSID and the password) can be written without encryption of the information according to the SMP.

The AType corresponding to the Handle "n13" includes the UUID "bbb4" of the Characteristic "Change Permission". A Permission change instruction, which is for changing values of an Attribute Permission, is to be written as the AValue corresponding to the Handle "n13". The APer corresponding to the Handle "n13" includes values indicating "Writeable without authentication".

Since the AC 138C has the above-described data structure, information is written as the AValue corresponding to the UUID "n12" in the AC 138C as follows, for example. When the CPU 132 (that is, the server) receives a Read By Type Request signal that designates the UUID "0x2803" from the client, the CPU 132 permits the client to read out the AValues corresponding to the UUIDs "0x2803" (that is, the property "Read (or Write)", the Handles "n10" to "n13", and the UUIDs "bbb1" to "bbb4") in accordance with "Readable without authentication" indicated by the APers corresponding to the UUID "0x2803". As a result, the client can read out these pieces of information, and based on these information, the client can be aware that it is possible to execute "Write" for information corresponding to the Handle "n12" and the UUID "bbb3", for example. Then, the client sends, to the server, a Write Request signal that designates the Handle "n12" and includes information to be written (that is, an SSID and a password). When the server receives this signal, the server permits the information to be written as the AValue corresponding to the Handle "n12" in accordance with "Writeable without authentication" indicated by the APer corresponding to the Handle "n12". Thereby, the client can write the SSID and the password.

(WFD Connection (WC) 138D)

As shown in FIG. 5, the WC 138D is a data group corresponding to a Handle range of "n14" to "n22". The AType corresponding to the Handle "n14" includes the UUID "0x2800" indicating that it is the first data in the WC 138D. The AValue corresponding to the Handle "n14" includes the UUID "ccc0" for distinguishing the WC 138D from the other PSs. The APer corresponding to the Handle "n14" includes values indicating "Readable without authentication".

Each of the ATypes corresponding to the Handles "n15" to "n18" includes the UUID "0x2803" indicating a Characteristic Declaration. The AValue corresponding to the Handle "n15" includes the property "Read", the Handle "n19", and includes the UUID "ccc1". Similarly, each of the AValues corresponding to the Handles "n16 to" to "n18" includes a property, a Handle, and a UUID. The properties corresponding to the Handles "n17" and "n18" are not "Read" but "Write". Further, each of the APers corresponding to the Handles "n15" to "n18" includes values indicating "Readable without authentication".

The AType corresponding to the Handle "n19" includes the UUID "ccc1" of the Characteristic "Connection Status". The AValue corresponding to the Handle "n19" includes the WFD state information (e.g., "Disable"). The APer corresponding to the Handle "n19" includes values indicating "Readable without authentication".

The AType corresponding to the Handle "n20" includes the UUID "ccc2" of the Characteristic "Connection Information". The AValue corresponding to the Handle "n20" can include encrypted WFD information. Here, before the WFD information 160 is encrypted, this AValue does not include encrypted WFD information, but includes empty information (e.g. Null value). Further, the APer corresponding to the Handle "n20" includes values indicating "Readable without authentication".

The AType corresponding to the Handle "n21" includes the UUID "ccc3" of the Characteristic "Public Key". A public key is to be written as the AValue corresponding to the Handle "n21". Further, the AType corresponding to the Handle "n22" includes the UUID "ccc4" of the Characteristic "Change Status". An instruction for changing the state relating to the WFD connection (e.g., an Enable instruction for changing the state of the printer 100 from "Disable" to "Enable", a Start instruction for causing the printer 100 to operate as G/O) is to be written as the AValue corresponding to the Handle "n22". Each of the APers corresponding to the Handles "n21" and "n22" includes values indicating "Writeable without authentication".

(BT Control (BC) 138E)

The BC 138E is a data group corresponding to a Handle range of "n23" to "n27". The AType corresponding to the Handle "n23" includes the UUID "0x2800" indicating that it is the first data in the BC 138E. The AValue corresponding to the Handle "n23" includes the UUID "ddd0" for distinguishing the BC 138E from the other PSs. The APer corresponding to the Handle "n23" includes values indicating "Readable without authentication".

Each of the ATypes corresponding to the Handles "n24" and "n25" includes the UUID "0x2803" indicating a Characteristic Declaration. The AValue corresponding to the Handle "n24" includes the property "Write", the Handle "n26", and the UUID "ddd1". Similarly, the AValue corresponding to the Handle "n25" includes a property, a Handle, and a UUID.

The AType corresponding to the Handle "n26" includes the UUID "ddd1" of the Characteristic "Pairing Control". A disconnect instruction for disconnecting an L2CAP Link is to be written as the AValue corresponding to the Handle "n26". The AType corresponding to the Handle "n27" includes the UUID "ddd2" of the Characteristic "Advertising Control". A resume flag OFF instruction for changing the resume flag 162 from "ON" to "OFF" is to be written as the AValue corresponding to the Handle "n27". Each of the APers corresponding to the Handles "n26" and "n27" includes values indicating "Writeable without authentication".

(Error Service (ES) 138F)

The ES 138F is a data group corresponding to a Handle range of "n28" to "n30". The AType corresponding to the Handle "n28" includes the UUID "0x2800" indicating that it is the first data in the ES 138F. The AValue corresponding to the Handle "n28" includes the UUID "eee0" for distinguishing the ES 138F from the other PSs. The APer corresponding to the Handle "n28" includes values indicating "Readable without authentication".

The AType corresponding to the Handle "n29" includes the UUID "0x2803" indicating a Characteristic Declaration. The AValue corresponding to the Handle "n29" includes the property "Read", the Handle "n30", and the UUID "eee1". The APer corresponding to the Handle "n29" includes values indicating "Readable without authentication".

The AType corresponding to the Handle "n30" includes the UUID "eee1" of the Characteristic "Error Information". The AValue corresponding to the Handle "n30" can include an error URL. Here, when the printer 100 is not in an error state, this AValue does not include an error URL, but includes empty information (e.g. Null value). Further, the APer corresponding to the Handle "n30" includes values indicating "Readable without authentication".

Figure 6:
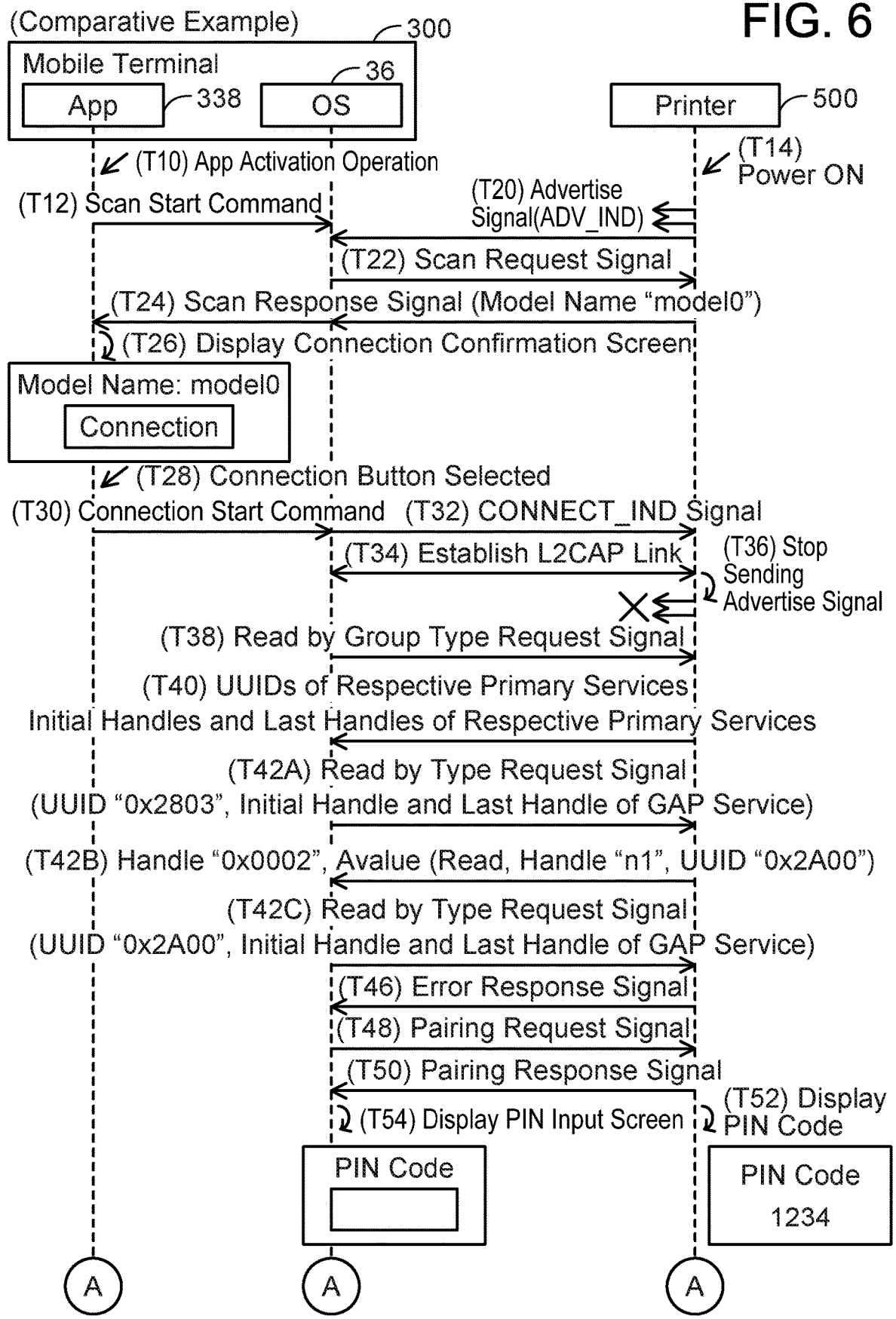
FIG. 6 shows a sequence diagram of a comparative example.
Figure 7:
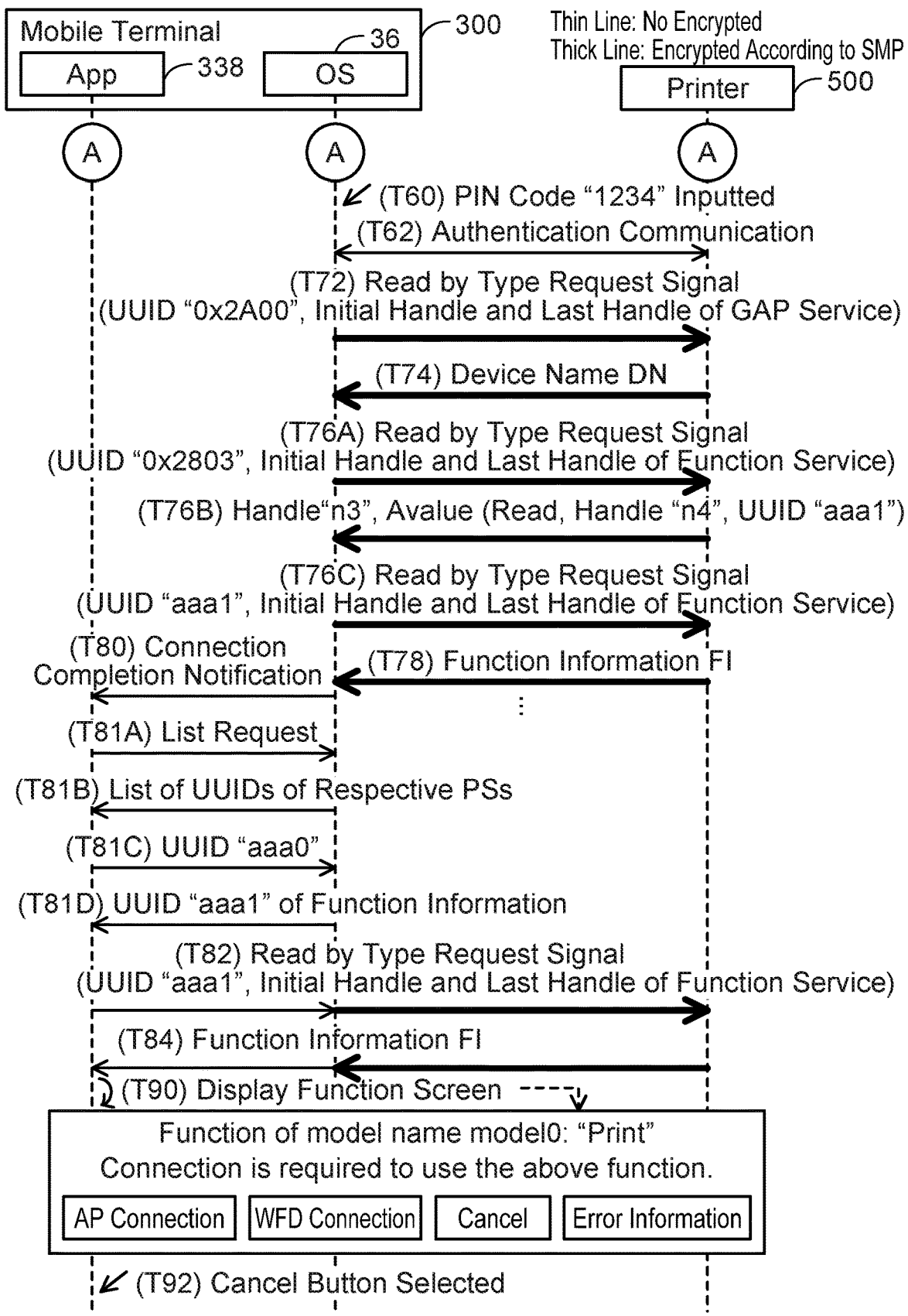
FIG. 7 shows a continuation of FIG. 6.

(Comparative Example; FIG. 6 and FIG. 7)

Before describing processes executed by the terminal 10 and the printer 100 of the present embodiment, processes executed by a portable terminal 300 (hereinbelow simply termed "terminal 300") and a printer 500 of a comparative example will be described. The terminal 300 comprises the OS 36, however, it comprises an app 338 that is different from the app 38 which realizes the processes of the present embodiment (see FIG. 8 to FIG. 18, to be described later). The printer 500 comprises a program that is different from the program 136 which realizes the processes of the present embodiment and does not store the resume flag 162. Further, a PS group of the comparative example includes at least the GA 138A and the FS 138B. Below, for easier understanding, processes executed by a CPU of the terminal 300 according to the OS 36 and the app 338 will be described with the OS 36 and the app 338 as subjects of action. Further, since all communications of the comparative example are executed via BT I/Fs of the terminal 300 and the printer 500, a phrase "via BT I/F" will be omitted below.

In T10, an operation for activating the app 338 is performed by the user to the terminal 300, as a result of which the app 338 is activated. In this case, in T12, the app 338 supplies a Scan start command to the OS 36. The Scan start command is a command for starting sending of a Scan Request signal.

Further, in T14, an operation for turning on the power of the printer 500 is performed by the user to the printer 500. In T20, the printer 500 starts sending an ADV signal by broadcast. This signal includes a connection allowance parameter "ADV_IND" predetermined by the BT scheme standard. This parameter indicates that establishment of an L2CAP Link with a device that receives the ADV signal is allowed. In a variant, the connection allowance parameter may be "ADV_DIRECT_IND".

In a case of obtaining the Scan start command from the app 338 (T12) and receiving the ADV signal from the printer 500 (T20), the OS 36 sends a Scan Request signal to the printer 500 in T22. This signal is a signal for requesting information of the sender device of the ADV signal (here, the printer 500).

In T24, the OS 36 receives a Scan Response signal from the printer 500 as a response to the Scan Request signal. This signal includes a model name "model0" of the printer 500. Upon receiving the signal, the OS 36 supplies the signal to the app 338.

Upon obtaining the Scan Response signal from the OS 36, the app 338 causes a display unit of the terminal 300 to display a connection confirmation screen in T26. The connection confirmation screen is a screen for confirming with the user whether to establish a wireless connection according to the BT scheme (that is, an L2CAP Link) with the printer 500. The connection confirmation screen includes the model name "model0" included in the Scan Response signal, and a connection button for accepting an instruction to establish an L2CAP Link.

Upon accepting selection of the connection button in the connection confirmation screen in T28, the app 338 supplies a connection start command to the OS 36 in T30. The connection start command is a command for starting sending of a CONNECT_IND signal. This signal is a signal for requesting establishment of an L2CAP Link. Among below-described processes of T30 to T80 which are triggered by the connection start command being obtained, processes executed by the OS 36 are executed automatically by the OS 36 and cannot be halted by a command from the app 338.

Upon obtaining the connection start command from the app 338 in T30, the OS 36 sends the CONNECT_IND signal to the printer 500 in T32. When this signal is sent to the printer 500, an L2CAP Link is established between the terminal 300 and the printer 500 in T34.

When the L2CAP Link is established in T34, the printer 500 stops sending the ADV signal in T36. That is, the printer 500 shifts from the Discoverable state to the non-Discoverable state. This stop on sending of the ADV signal in response to establishment of the L2CAP Link is, for example, according to the specifications of a chip of the BT I/F 116.

The OS 36 executes below-described processes of T38 to T78 by using the L2CAP Link established in T34. The processes of T38 to T78 are executed according to the specifications of iOS. That is, iOS has specifications for automatically obtaining information of a PS group when an L2CAP Link is established. In T38, the OS 36 sends a Read By Group Type Request signal (hereinbelow simply termed "Group_Req signal") defined by the ATT to the printer 500. The Group_Req signal is a signal for reading out information that indicates a configuration of PS group in a protocol stack of the printer 500.

Upon receiving the Group_Req signal from the terminal 300 in T38, the printer 500 sends in T40, to the terminal 300, UUIDs of its respective PSs, initial Handles of the PSs, and last Handles of the PSs, as a response to the Group_Req signal. Specifically, the printer 500 obtains, from its PS group, the AValues corresponding to the UUID "0x2800" indicating the first data. As shown in FIG. 3, the UUID "0x1800" of the GA 138A, "aaa0" of the FS 138B, and the like are obtained as the AValues corresponding to the UUID "0x2800". Further, the printer 500 obtains the initial Handles of the respective PSs (e.g., the initial Handle "0x0001" of the GA 138A, the initial Handle "n2" of the FS 138B, etc.), and the last Handles of the respective PSs (e.g., the last Handle of the GA 138A (the value immediately before n2), the last Handle "n4" of the FS 138B, etc.). Then, the printer 500 sends the obtained information to the terminal 300. Thereby, the terminal 300 can be aware of the configuration of the PS group of the printer 500.

Next, the OS 36 uses the information received in T40 to sequentially send to the printer 500 a plurality of Read By Type Request signals (hereinbelow, simply termed "Type_Req signals") corresponding to the plurality of PSs. The Type_Req signals are signals that designate ATypes, and are for reading out the AValues corresponding to the designated ATypes, Specifically, the OS 36 executes the following processes.

First, in T42A, the OS 36 sends a Type_Req signal to the printer 500, for the GA 138A which is the PS corresponding to the Handle "0x0001" having the smallest value. Specifically, in T42A, the OS 36 sends, to the printer 500, a Type_Req signal that includes the UUID "0x2803" (that is, the Characteristic Declaration), the initial Handle "0x0001" of the GA 138A, and the last Handle of the GA 138A (description omitted).

Upon receiving the Type_Req signal from the terminal 300 in T42A, the printer 500 specifies the Handle "0x0002" corresponding to the UUID "0x2803" included in the Type_Req signal, from among the data group included within the Handle range indicated by the initial Handle "0x0001" and the last Handle included in the Type_Req signal. Next, the printer 500 specifies the AValue and the APer corresponding to the specified Handle "0x0002". Here, the specified APer indicates "Readable without authentication". Therefore, the printer 500 sends in T42B the specified Handle "0x0002" and the specified AValue (that is, the property "Read", the Handle "n1", and the UUID "0x2A00") to the terminal 300 as a response to the Type_Req signal, without encryption of the information according to the SMP.

Upon receiving the Handle "0x0002" and the AValue from the printer 500 in T42B, the OS 36 sends a Type_Req signal including the UUID "0x2A00" of the AValue to the printer 500 in T42C. The signal further includes the initial Handle "0x0001" of the GA 138A and the last Handle of the GA 138A.

Upon receiving the Type_Req signal from the terminal 300 in T42C, the printer 500 specifies the Handle "n1" corresponding to the UUID "0x2A00" included in the Type_Req signal, from among the data group included within the Handle range indicated by the initial Handle "0x0001" and the last Handle included in the signal. Next, the printer 500 specifies the AValue and the APer corresponding to the specified Handle "n1". Here, the specified APer indicates "Readable without authentication when discoverable". As described above, the printer 500 is currently in the non-Discoverable state. Therefore, the printer 500 permits the information to be read out on condition that the information is encrypted according to the SMP. However, a key for encrypting the information according to the SMP (a Long Term Key, which is to be described later, in the present comparative example) has not been created yet at this time. For this reason, the printer 500 cannot encrypt the information according to the SMP, as a result of which the printer 500 sends an Error Response signal to the terminal 300 in T46.

Upon receiving the Error Response signal from the printer 500 in T46, the OS 36 sends a Pairing Request signal to the printer 500 in T48. This signal is a signal for starting a process related to the SMP.

Upon receiving the Pairing Request signal from the terminal 300 in T48, the printer 500 sends a Pairing Response signal to the terminal 300 in T50. Then, in T52, the printer 500 displays a PIN code "1234". Thereby, the user can be aware of the PIN code "1234".

Upon receiving the Pairing Response signal from the printer 500 in T50, the OS 36 causes the display unit of the terminal 300 to display, in T54, a PIN input screen to which a PIN code is inputted.

As shown in FIG. 7, in T60, the OS 36 accepts input of the PIN code "1234" in the PIN input screen. As a result, in T62, authentication communication according to the SMP is executed between the OS 36 and the printer 500. During at least a part of the authentication communication, encrypted information, which is information encrypted by the inputted PIN code "1234", is communicated. Then, in a case where decryption of the encrypted information succeeds, the printer 500 sends a Long Term Key. (hereinbelow simply termed "Key") to the terminal 300. Thereby, in below-described processes from T72 onward, information to be communicated by the BLE between the OS 36 and the printer 500 is encrypted by the Key. In FIG. 7, thin arrows and thick arrows respectively represent communication of unencrypted information and communication of information encrypted in accordance with the SMP. The same applies to the following figures.

Upon completion of the authentication communication of T62, the OS 36 again sends a Type_Req signal, which is the same as that of T42C of FIG. 6, to the printer 500 in T72. As described above, the information in this signal is encrypted by the Key.

Upon receiving the Type_Req signal from the terminal 300 in T72, the printer 500 decrypts the information in the signal by using the Key and specifies the Handle "n1" corresponding to the UUID "0x2A00" included in the Type_Req signal from among the data group included within the Handle range indicated by the initial Handle "0x0001" and the last Handle included in the decrypted information. Next, the printer 500 specifies the AValue and the APer corresponding to the specified Handle "n1". Here, the specified APer indicates "Readable without authentication when discoverable". Although the printer 500 is in the non-Discoverable state, it can encrypt information according to the SMP because the authentication process of T62 has been executed. Therefore, the printer 500 permits the information included in this AValue (that is, the device name DN) to be read out. Therefore, the printer 500 encrypts the device name DN by using the Key, and sends the encrypted device name DN to the terminal 300 in T74.

Next, in T76A, the OS 36 sends a Type_Req signal to the printer 500, for a PS that corresponds to the second smallest Handle after the Handle "0x0001" in the PS group. That is, the OS 36 sends a Type_Req signal to the printer 500, for the FS 138B (Handle "n2") which is the next PS to the GA 138A (Handle "0x0001"). This signal includes the UUID "0x2803", the initial Handle "n2" of the FS 138B, and the last Handle "n4" of the FS 138B. T76B is the same as T42B of FIG. 6, except that the Handle "n3" corresponding to the UUID "0x2803" and the AValue corresponding to the Handle "n3" (that is, the property "Read", the Handle "n4", and the UUID "aaa1") are sent to the terminal 300.

Upon receiving the Handle "n3" and the AValue from the printer 500 in T76B, the OS 36 sends a Type_Req signal including the UUID "aaa1" to the printer 500 in T76C. This signal includes the initial Handle "n2" of the FS 138B and the last Handle "n4" of the FS 138B.

Upon receiving the Type_Req signal from the terminal 300 in T76C, the printer 500 decrypts the information in this signal by using the Key and specifies the Handle "n4" corresponding to the UUID "aaa1" included in the Type_Req signal from among the data group included within the Handle range indicated by the initial Handle "n2" and the last Handle "n4" included in the decrypted information. Next, the printer 500 specifies the AValue and the APer corresponding to the specified Handle "n4". Here, the specified APer indicates "Readable without authentication". Therefore, the printer 500 permits the information included as this AValue (that is, the function information FI) to be read out. Therefore, the printer 500 encrypts the function information FI by using the Key and sends the encrypted function information FI to the terminal 300 in T78.

After receiving the function information FI om the printer 500 in T78, the OS 36 sequentially sends, to the printer 500, Type_Req signals corresponding to the remaining PSs in the PS group. By automatically executing the above-described processes of T38 to T78 and sending the Type_Req signals corresponding to the remaining PSs, the OS 36 can be aware of the information of the PS group, that is, the properties, the UUIDs, and the Handles of the Characteristics included in the PSs.

Upon completion of sending all the plurality of Type_Req signals corresponding to the plurality of PSs, the OS 36 supplies a connection completion notification to the app 338 in T80. The connection completion notification is a response to the connection start command of T30 of FIG. 6.

Upon obtaining the connection completion notification from the OS 36 in T80, the app 338 supplies in T81A, to the OS 36, a list request for requesting a first list that indicates the UUIDs of the PSs. Thereby, in T81B, the app 338 obtains the first list from the OS 36. Next, in T81C, the app 338 selects the UUID "aaa0" of the FS 138B from the first list and supplies the selected UUID "aaa0" to the OS 36. Thereby, in T81D, the app 338 obtains, from the OS 36, a second list that includes the properties and the UUIDs of the Characteristics in the FS 138B (here, a list including only one set of the property "Read" and the UUID "aaa1").

Upon obtaining the second list from the OS 36 in T81D, the app 338 selects the UUID "aaa1" from the second list and requests the OS 36 to send a Type_Req signal including the selected UUID "anal" in accordance with the property "Read" corresponding to the UUID "aaa1" in T82. As a result, the OS 36 sends a Type_Req signal that includes the UUID "aaa1", and the initial Handle "n2" and the last Handle "n4" of the FS 138B to the printer 500.

Upon receiving the Type_Req signal including the UUID "aaa1" from the terminal 300 in T82, the printer 500 sends in T84 the function information FI to the terminal 300 as a response to the Type_Req signal, as in T78.

Upon receiving the function information FI from the printer 500 in T84, the OS 36 supplies the received function information FI to the app 338.

Upon obtaining the function information FI from the OS 36 in T84, the app 338 displays a function screen indicating the functions of the printer 500 in T90. The function screen includes the model name "model0" of the printer 500 and character information that indicates the print function among the plurality of functions of the printer 500 indicated by the function information FI. Further, in the present case, the function information FI indicates that the printer 500 can establish an AP connection, establish a WFD connection, and send error information. As buttons for executing these functions, the function screen includes an AP connection button, a WFD connection button, and an error information button. The AP connection button is a button for accepting an instruction to establish an AP connection. The WFD connection button is a button for accepting an instruction to establish a WFD connection. The error information button is a button for accepting an instruction to display an error URL. The function screen further includes a Cancel button. The Cancel button is a button for accepting an instruction to cancel subsequent processes.

In the present comparative example, the plurality of functions that the printer 500 is capable of executing (that is, the print function, the AP connection, the WFD connection) does not include a function desired by the user. In this case, in T92, the user selects the Cancel button in the function screen. As a result, the display of the function screen is terminated, and the process of FIG. 7 ends.

According to the present comparative example, the authentication communication of T62 is executed before the function screen is displayed in the terminal 300 in T90. That is, if the user does not input the PIN code to the terminal 300 (T60), the function screen is not displayed in the terminal 300. Further, in the present comparative example, the function desired by the user is not included in the plurality of functions displayed in the function screen. That is, according to the present comparative example, the user has to input the PIN code even if the function desired by the user is not included in the plurality of functions that the printer 500 is capable of executing. In view of this, the present embodiment prevents authentication communication from being executed between the printer 100 and the terminal 10 if a function desired by the user is not included in the plurality of functions that the printer 100 is capable of executing. Thereby, the user does not need to perform the operation of inputting a PIN code if the function desired by the user is not included in the plurality of functions that the printer 100 is capable of executing. As a result, user convenience is improved.

Figure 8:
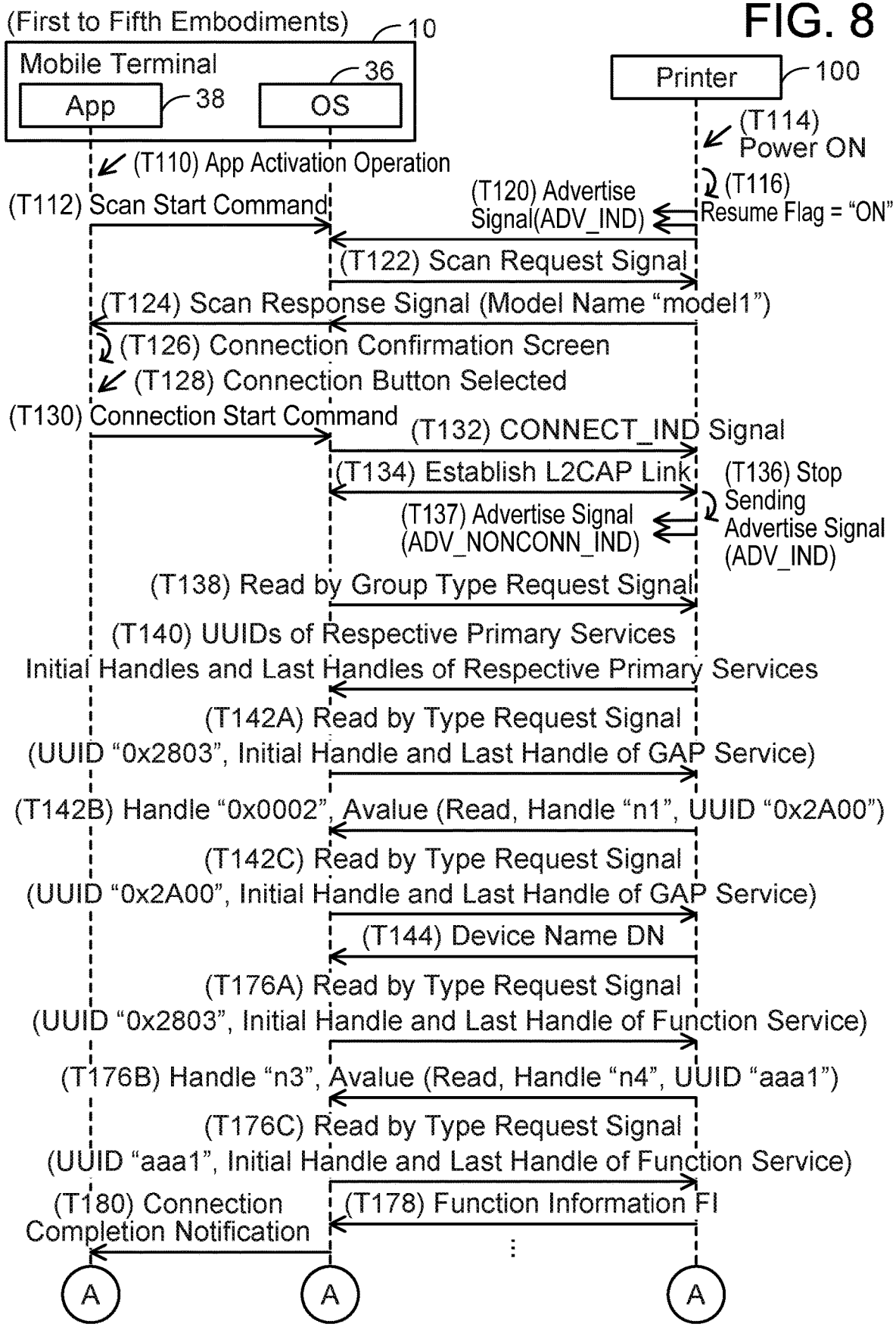
FIG. 8 shows a sequence diagram of processes common among first to fifth embodiments.
Figure 9:
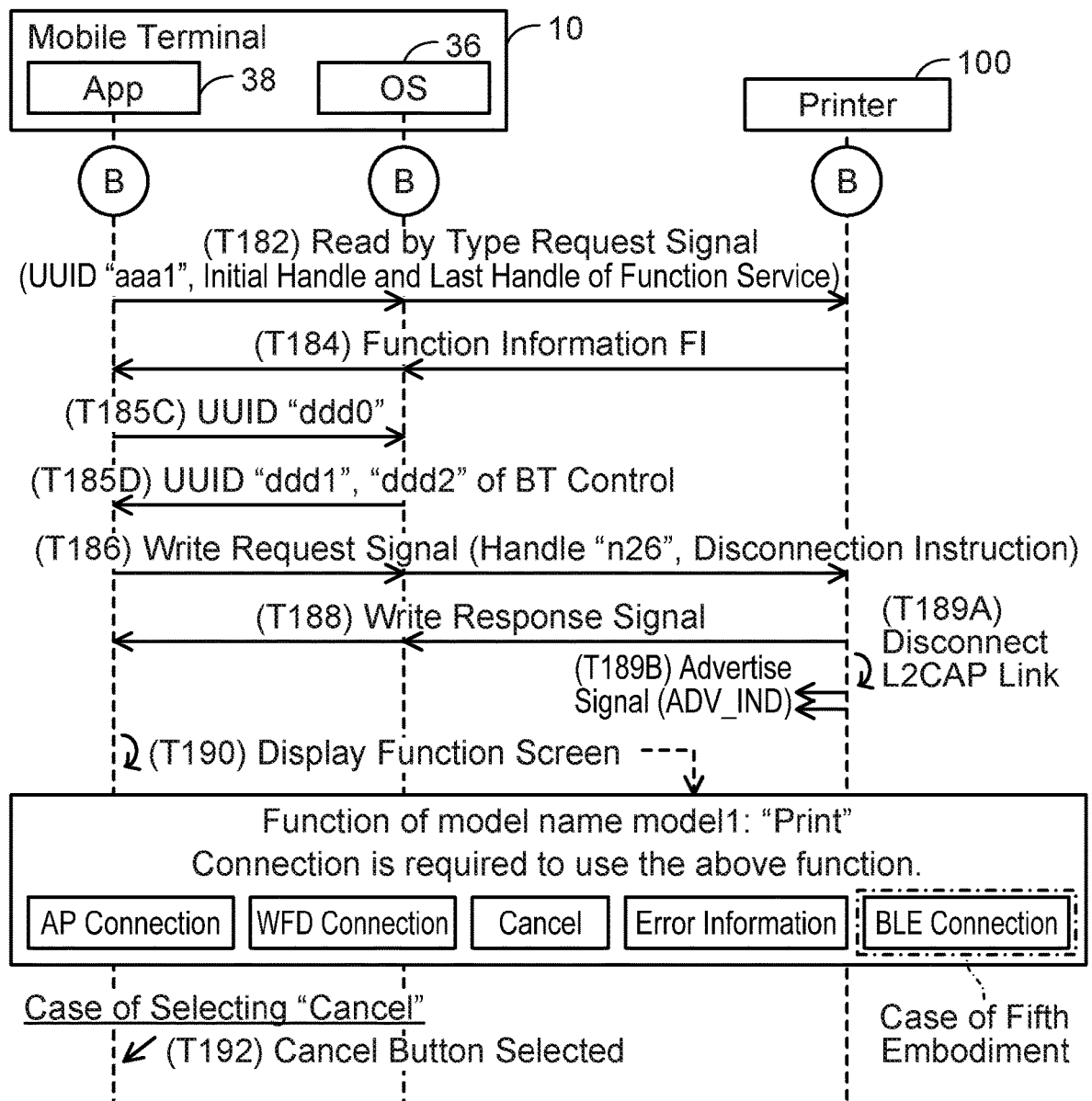
FIG. 9 shows a continuation of FIG. 8.

(Case for Cancel; FIG. 8, FIG. 9)

A case in which the Cancel button of the function screen is selected in the present embodiment will be described with reference to FIG. 8 and FIG. 9. Below, for easier understanding, processes executed by the CPU 32 of the terminal 10 according to the OS 36 and the app 38 will be described with the OS 36 and the app 38 as the subjects of action. Processes executed by the CPU 132 of the printer 100 according to the program 136 will be described with the printer 100 as the subject of action. Further, unless otherwise mentioned, communications in the present embodiment are executed via the BT I/Fs of the terminal 10 and the printer 100, so a phrase "via the BT I/F 16 (or 116)" will be omitted below.

T110, T112 are respectively the same as T10, T12 of FIG. 6. When an operation for turning on the power of the printer 100 is performed by the user in T114, the printer 100 sets the resume flag 162 to "ON" in T116. Then, in T120, the printer 100 starts sending by broadcast an ADV signal including the connection allowance parameter "ADV_IND".

Since the OS 36 receives the ADV signal from the printer 100 (T120), the OS 36 sends a Scan Request signal to the printer 100 in T122, and receives a Scan Response signal including a model name "model1" from the printer 100 and supplies this signal to the app 38 in T124.

T126 to T132 are the same as T26 to T32 of FIG. 6, except that the connection confirmation screen includes the model name "model1". The OS 36 sends a CONNECT_IND signal to the printer 100 in T132 and establishes an L2CAP Link between the terminal 10 and the printer 100 in T134.

Upon the L2CAP Link being established in T134, the printer 100 stops sending the ADV signal in T136. As described above, the resume flag 162 currently indicates "ON". For this reason, immediately after stopping the sending of the ADV signal in T136, the printer 100 resumes sending the ADV signal in T137. That is, immediately after shifting from the Discoverable state to the non-Discoverable state, the printer 100 again shifts to the Discoverable state. Here, the ADV signal after the resuming does not include the connection allowance parameter "ADV_IND" but includes a connection non-allowance parameter "ADV_NONCON-N_IND". This parameter indicates that establishment of an L2CAP Link with a device that receives the ADV signal is not allowed. A device that received the ADV signal including this parameter does not send a Scan_Request signal, as a result of which an L2CAP Link is not established between this device and the printer 100. According to this configuration, in a case where the ADV signal after the resuming is received by a device different from the terminal 10, establishment of an L2CAP Link between this different device and the printer 100 can be prevented.

The OS 36 executes below-described processes of T138 to T178 by using the L2CAP Link established in T134. T138 to T142C are the same as T38 to T42C of FIG. 6.

Upon receiving the Type_Req signal including the UUID "0x2A00" from the terminal 10 in T142C, the printer 100 specifies the Handle "n1" corresponding to the UUID "0x2A00" included in the Type_Req signal, from among the data group included within the Handle range indicated by the initial Handle "0x0001" and the last Handle included in the Type_Req signal. Next, the printer 100 specifies the AValue and the APer corresponding to the specified Handle "n1". Here, the specified APer indicates "Readable without authentication when discoverable", As described above, the printer 100 is currently in the Discoverable state (T137). Therefore, the printer 100 permits information to be read out without encryption of the information according to the SMP. As a result, in T144, the printer 100 sends the device name DN, which is the AValue corresponding to the UUID "0x2A00", to the terminal 10 without encrypting the information according to the SMP. Since the printer 100 again shifts to the Discoverable state in T137 as described above, the printer 100 can send the device name DN to the terminal 10 in the case of receiving the Type_Req signal in T142C, without sending an Error Response signal to the terminal 10 as in T46 of FIG. 6, that is, without requiring input of a PIN code to the terminal 10.

Upon receiving the device name DN from the printer 100 in T144, the OS 36 sends a Type_Req signal corresponding to the FS 138B to the printer 100 in T176A. T176A to T176C are the same as T76A to T76C of FIG. 7, except that the encryption by using the Key is not executed.

Upon receiving the Type_Req signal from the terminal 10 in T176C, the printer 100 specifies the Handle "n4" corresponding to the UUID "aaa1" included in the Type_Req signal, from among the data group included within the Handle range indicated by the initial Handle "n2" and the last Handle "n4" included in the Type_Req signal. Next, the printer 100 specifies the AValue and the APer corresponding to the specified Handle "n4". Here, the specified APer indicates "Readable without authentication". Therefore, the printer 100 permits the information included in this AValue (that is, the function information FI) to be read out. As a result, in T178, the printer 100 sends the function information FI to the terminal 10 without encrypting the information according to the SMP.

Upon receiving the function information FI from the printer 100 in T178, the OS 36 sequentially sends, to the printer 100, Type_Req signals corresponding to the remaining PSs in the PS group and receives the AValues corresponding to the property "Read" of the remaining PSs from the printer 100. Then, in T180, the OS 36 supplies a connection completion notification to the app 38.

As shown in FIG. 9, upon obtaining the connection completion notification from the OS 36 in T180, the app 38 executes the same processes as T81A to T81D of FIG. 7, and requests the OS 36 to send a Type_Req signal including the UUID "aaa1" in T182. As a result, the OS 36 sends a Type_Req signal including the UUID "aaa1", and the initial Handle "n2" and the last Handle "n4" of the FS 138B to the printer 100.

Upon sending the Type_Req signal to the printer 100 in T182, the OS 36 receives the function information FI from the printer 100 and supplies the received function information FI to the app 38 in T184.

Upon obtaining the function information FI from the OS 36 in T184, the app 38 selects the UUID "ddd0" of the BC 138E from a first list that includes the UUIDs of respective PSs and supplies the selected UUID "ddd0" to the OS 36 in T185C. Thereby, in T185D, the app 38 obtains a second list that includes the UUIDs of the Characteristics in the BC 138E (that is, a list including the two UUIDs "ddd1", "ddd2") from the OS 36.

Upon obtaining the second list from the OS 36 in T185D, the app 38 selects the UUID "ddd1" from the second list and requests the OS 36 to send a Write Request signal including a disconnect instruction in T186. As a result, the OS 36 sends, to the printer 100, a Write Request signal that includes the Handle "n26" corresponding to the selected UUID "ddd1" and the disconnect instruction.

Upon receiving the Write Request signal from the terminal 10 in T186, the printer 100 specifies the AValue and the APer corresponding to the Handle "n26" included in this signal. Here, the specified APer indicates "Writeable without authentication". Therefore, the printer 100 permits the information included in this signal (that is, the disconnect instruction) to be written as the specified AValue. That is, the printer 100 stores the disconnect instruction as this AValue.

Upon the disconnect instruction being stored, the printer 100 sends a Write Response signal to the terminal 10 in T188. Further, in accordance with the stored disconnect instruction, the printer 100 disconnects, in T189A, the L2CAP Link established in T134 of FIG. 8.

Upon disconnecting the L2CAP Link, the printer 100 starts sending the ADV signal including the connection allowance parameter "ADV_IND" in T189B, instead of sending the ADV signal including the connection non-allowance parameter.

Further, upon receiving the Write Response signal from the printer 100 in T188, the terminal 10 displays a function screen indicating the functions of the printer 100 in T190. The function screen of T190 is the same as the function screen of T90 of FIG. 7, except that the model name is different.

In the present case, the plurality of functions that the printer 100 is capable of executing (that is, the print function, the AP connection, the WFD connection) does not include a function desired by the user. In this case, in T192, the user selects the Cancel button in the function screen. As a result, the display of the function screen is terminated, and the process of FIG. 9 ends.

According to the present case, the printer 100 resumes sending the ADV signal after the establishment of the L2CAP Link (T137 of FIG. 8). Thereby, the state of the printer 100 becomes the Discoverable state. For this reason, in the case of receiving the Type_Req signal (T142C), the printer 100 sends the device name DN to the terminal 10 without encrypting the information according to the SMP (T144). That is, unlike the comparative example of FIG. 6, authentication communication is not executed before the function screen is displayed in the terminal 10. Thereby, it is possible to prevent authentication communication from being executed between the printer 100 and the terminal 10 in a case where the function desired by the user is not included in the plurality of functions that the printer 100 is capable of executing. That is, the user does not need to perform the operation of inputting a PIN code in the case where the function desired by the user is not included in the plurality of functions that the printer 100 is capable of executing. As a result, user convenience is improved.

Figure 10:
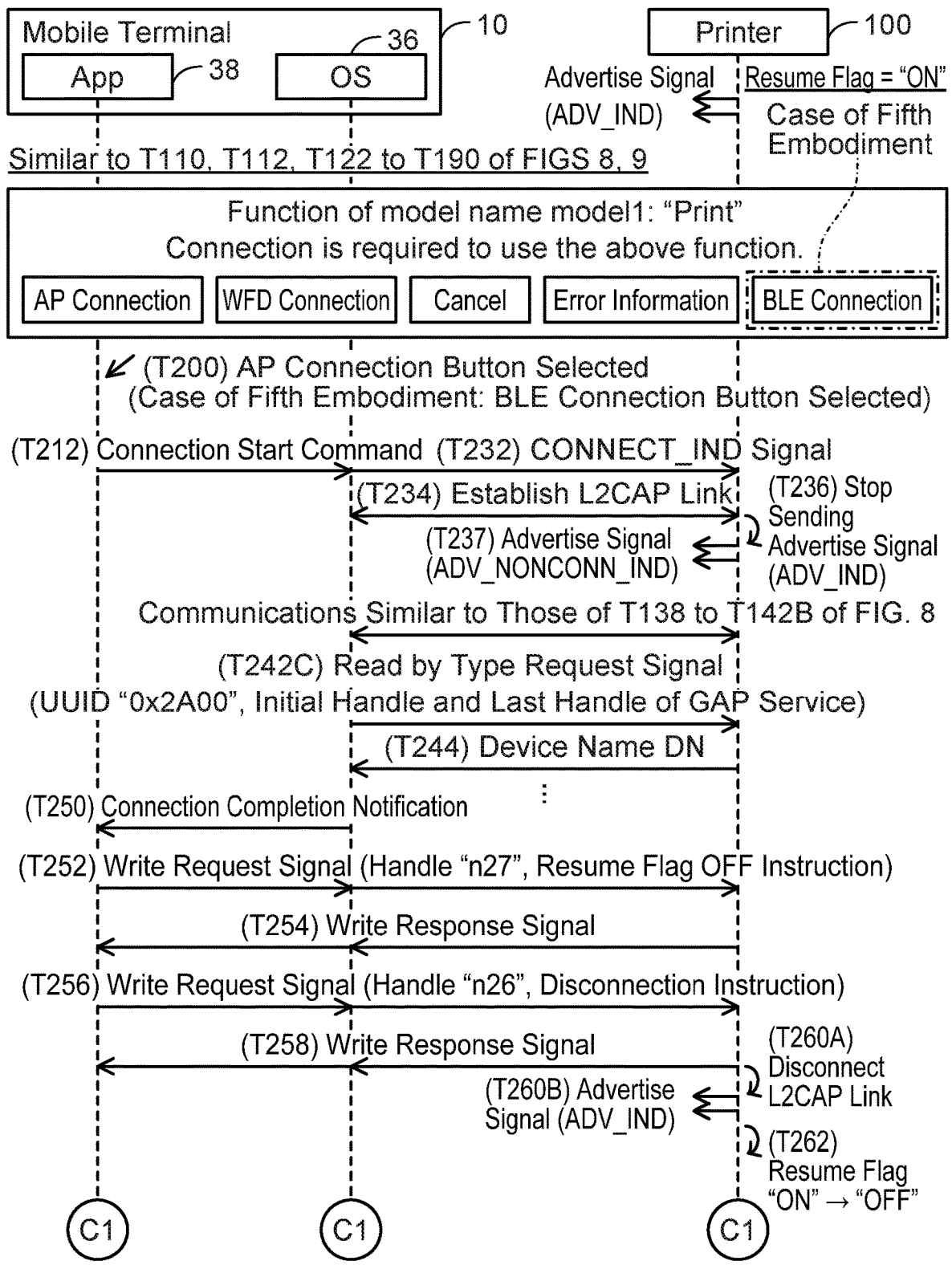
FIG. 10 shows a sequence diagram for a case in which an AP connection button in a function screen is selected in the first and second embodiments, or a case in which a BLE connection button in a function screen is selected in the fifth embodiment.
Figure 11:
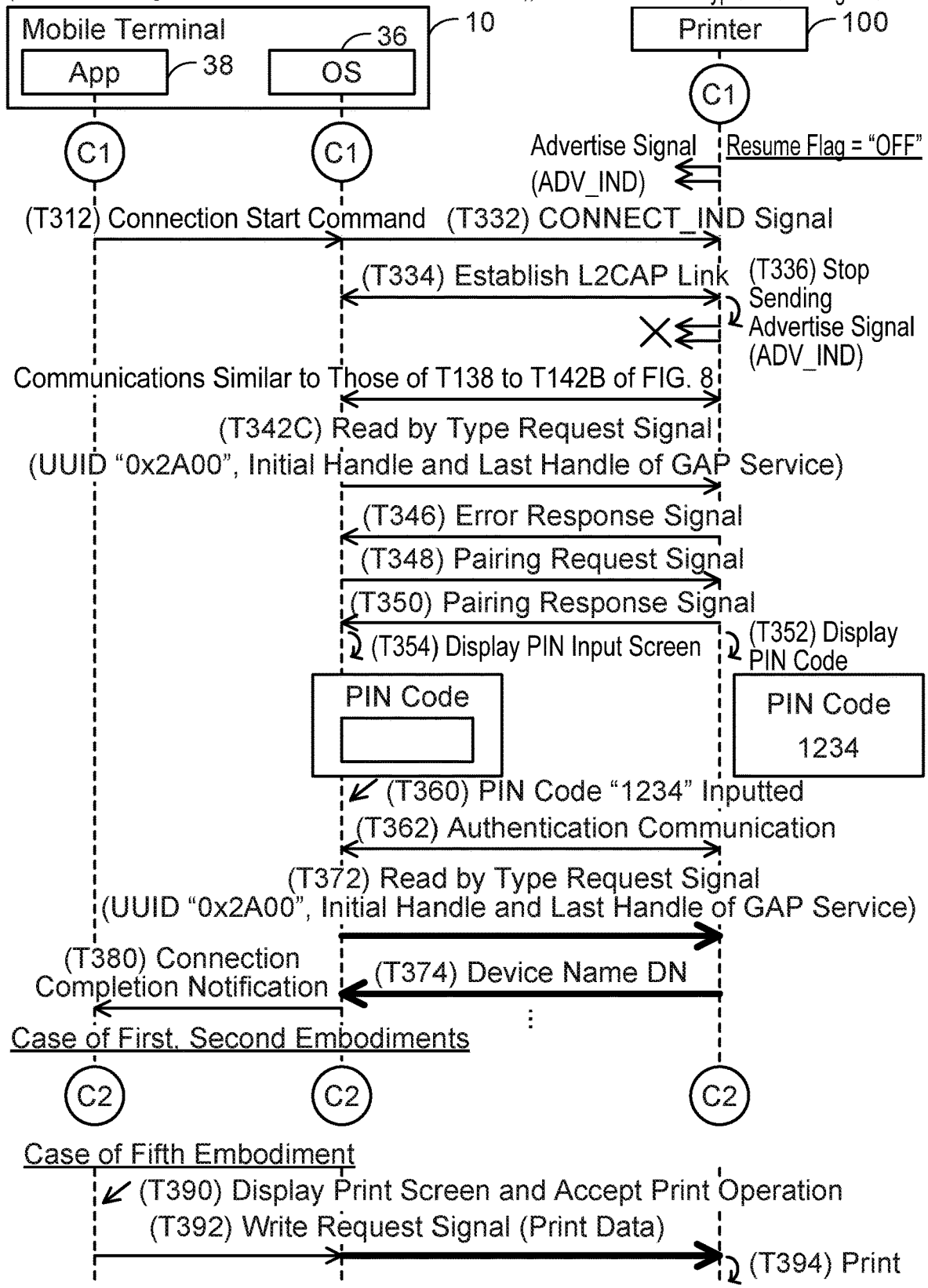
FIG. 11 shows a continuation of FIG. 10.
Figure 12:
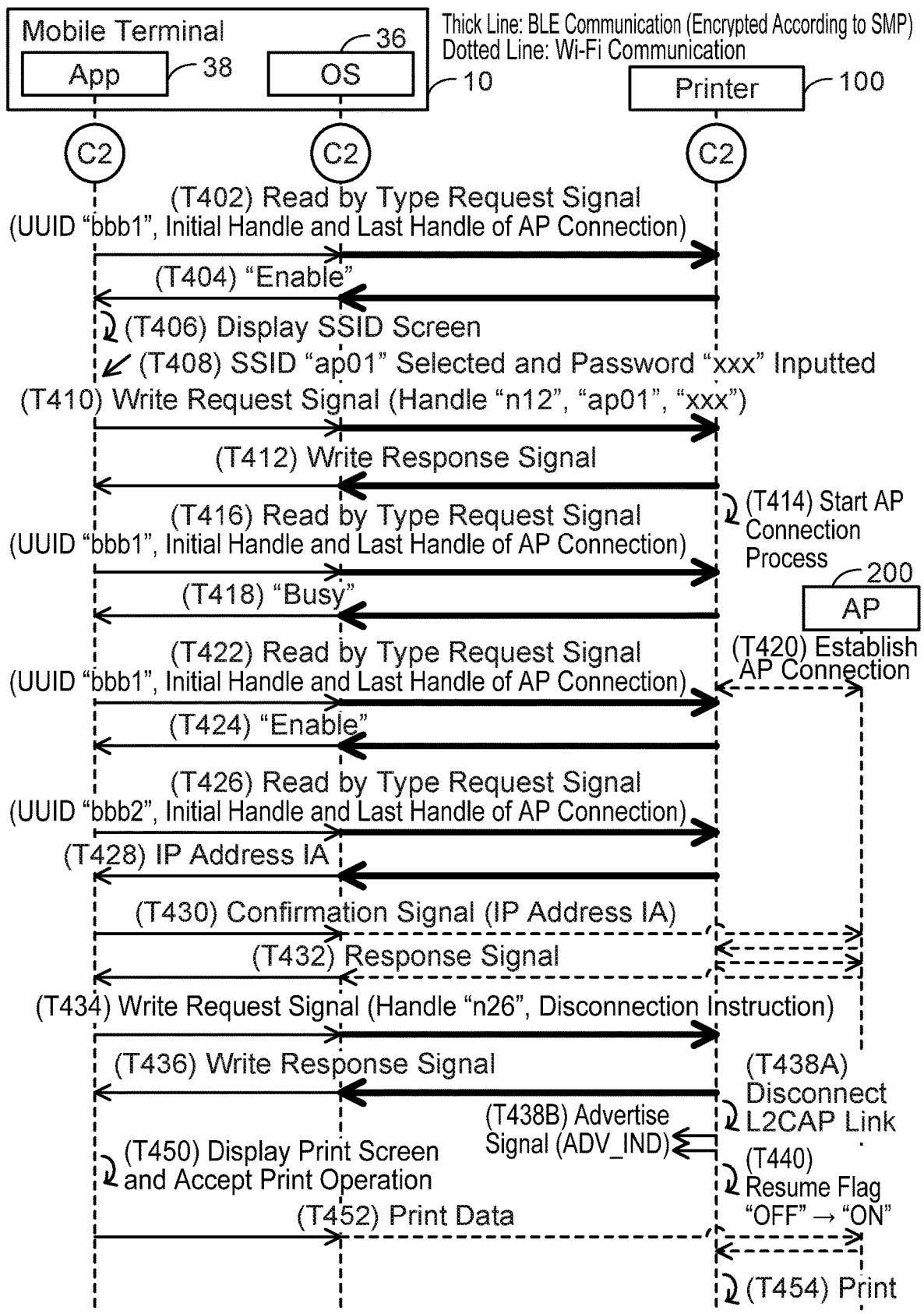
FIG. 12 shows a continuation of FIG. 11.

(Case for AP Connection; FIG. 10 to FIG. 12)

A case in which the AP connection button in the function screen is selected in the present embodiment will be described with reference to FIG. 10 to FIG. 12. In the present case, the plurality of functions that the printer 100 is capable of executing (that is, the print function, the AP connection, the WFD connection) includes the AP connection function which is desired by the user. In this case, in T200, the user selects the AP connection button in the function screen.

Upon accepting selection of the AP connection button in T200, the app 38 supplies a connection start command to the OS 36 in T212. Thereby, the OS 36 sends a CONNECT_IND signal to the printer 100 in T232, and establishes an L2CAP Link between the terminal 10 and the printer 100 in T234.

Upon the L2CAP Link being established in T234, the printer 100 stops sending the ADV signal in T236. Then, since the resume flag 162 indicates "ON", the printer 100 resumes sending the ADV signal in T237. That is, the printer 100 again shifts to the Discoverable state.

Further, the OS 36 executes the same communications as those of T138 to T142B of FIG. 8 (that is, sends a Group_Req signal and sends a Type_Req signal including the UUID "0x2803") by using the L2CAP Link established in T234. Then, in T242C, the OS 36 sends a Type_Req signal including the UUID "0x2A00" to the printer 100 as in T142C of FIG. 8.

Upon the printer 100 receiving the Type_Req signal from the terminal 10 in T242C, the printer 100 sends the device name DN to the terminal 10 in T244, as in T144 of FIG. 8, due to the APer indicating "Readable without authentication when discoverable" and the printer 100 being in the Discoverable state.

Upon receiving the device name DN from the printer 100 in T244, the OS 36 executes the same communications as those of T176A to T178 of FIG. 8, and sequentially sends Type_Req signals corresponding to the remaining PSs in the PS group to the printer 100. Then, as in the case of FIG. 8, the OS 36 receives the AValues corresponding to the property "Read" of the remaining PSs from the printer 100 without receiving an Error Response signal, and supplies a connection completion notification to the app 38 in T250.

Upon obtaining the connection completion notification from the OS 36 in T250, the app 38 obtains a second list that indicates the UUIDs of the Characteristics in the BC 138E from the OS 36 in T252. Then, the app 38 sends a Write Request signal including the Handle "n27" corresponding to the UUID "ddd2" in the second list and a resume flag OFF instruction to the printer 100 via the OS 36.

Upon receiving the Write Request signal from the terminal 10 in T252, the printer 100 stores the resume flag OFF instruction as the AValue corresponding to the Handle "n27" due to the APer corresponding to the Handle "n27" indicating "Writeable without authentication". Then, in T254, the printer 100 sends a Write Response signal to the terminal 10.

Further, as in T186 of FIG. 9, the app 38 sends a Write Request signal including the Handle "n26" and a disconnect instruction to the printer 100 in T256. Then, as in T188 of FIG. 9, the app 38 receives a Write Response signal from the printer 100 in T258. As a result, the disconnect instruction is stored as the AValue corresponding to the Handle "n26".

Upon the resume flag OFF instruction and the disconnect instruction being stored as the AValues, the printer 100 disconnects in T260A the L2CAP Link established in T234 in accordance with the stored disconnect instruction, and starts sending the ADV signal including the connection allowance parameter "ADV_IND" in T260B. Further, in T262, the printer 100 changes the resume flag 162 from "ON" to "OFF" in accordance with the stored resume flag OFF instruction. Thereby, in the subsequent processes, sending of the ADV signal is not resumed.

As shown in FIG. 11, upon receiving the Write Response signal from the printer 100 in T258, the app 38 supplies a connection start command to the OS 36 in T312. T322 to T336 are the same as T132 to T136 of FIG. 8. Here, since the resume flag 162 was changed to "OFF" in T262 of FIG. 10, the printer 100 does not resume sending the ADV signal. That is, the printer 100 is in the non-Discoverable state.

Further, the OS 36 executes the same communications as those of T138 to T142B of FIG. 8 by using the L2CAP Link established in T234. Then, as in T142C of FIG. 8, the OS 36 sends a Type_Req signal including the UUID "0x2A00" to the printer 100 in T342C.

At the time of reception of the Type_Req signal from the terminal 10 in T342C, the Key has not been created yet. For this reason, the printer 100 sends an Error Response signal to the terminal 10 in T346 due to the APer indicating "Readable without authentication when discoverable" and the printer 100 being in the non-Discoverable state.

Upon receiving the Error Response signal from the printer 100 in T346, the OS 36 sends a Pairing Request signal to the printer 100 in T348, and receives a Pairing Response signal from the printer 100 in T350. As a result, the printer 100 displays the PIN code "1234" in T352, and the terminal 10 displays the PIN input screen on the display unit 12 of the terminal 10 in T354.

Upon accepting input of the PIN code "1234" in the PIN input screen in T360, the OS 36 executes authentication communication according to the SMP between the OS 36 and the printer 100 in T362. In this authentication communication, encrypted information encrypted by the inputted PIN code "1234" is successfully decripted, and the Key is sent from the printer 100 to the terminal 10. Thereby, in below-described processes from T372 onward, information communicated according to the BT scheme between the OS 36 and the printer 100 is encrypted by the Key.

Upon completion of the authentication communication of T362, the OS 36 again sends a Type_Req signal to the printer 100 in T372, as in T342C. However, as described above, the information in this Type_Req signal is encrypted by the Key.

At the time of reception of the Type_Req signal from the terminal 10 in T372, the Key has already been created and information can thereby be encrypted according to the SMP. Therefore, the printer 100 encrypts the device name DN by using the Key and sends the encrypted device name DN to the terminal 10 in T374 due to the APer indicating "Readable without authentication when discoverable" and the printer 100 being in the non-Discoverable state.

Upon receiving the device name DN from the printer 100 in T374, the OS 36 executes the same communications as those of T176A to T178 of FIG. 8, except that encryption by the Key is executed, and sequentially sends Type_Req signals corresponding to the remaining PSs in the PS group to the printer 100. As a result, the OS 36 receives the AValues corresponding to the property "Read" of the remaining PSs from the printer 100, and supplies a connection completion notification to the app 38 in T380.

As shown in FIG. 12, upon obtaining the connection completion notification from the OS 36 in T380, the app 38 obtains a second list that indicates the UUIDs of the Characteristics in the AC 138C from the OS 36 in T402. Then, the app 38 sends a Type_Req signal including the UUID "bbb1" in the second list, and the initial Handle "n5" and last Handle "n13" of the AC 138C to the printer 100 via the OS 36.

In the present case, at the time of the sending of the Type_Req signal to the printer 100 in T402, the AP state information of the printer 100 has been set in "Enable". Therefore, when the app 38 sends the Type_Req signal to the printer 100 in T402, the app 38 receives the AP state information "Enable" corresponding to the UUID "bbb1" from the printer 100 via the OS 36 in T404.

Upon obtaining the AP state information "Enable" from the OS 36 in T404, the app 38 displays an SSID screen on the display unit 12 in T406. The SSID screen includes a list of SSID for identifying the AP networks of the AP 200 in which the terminal 10 is currently participating, and an input field to which a password is inputted. This list includes the SSID "ap01" of the AP 200.

In T408, the app 38 accepts selection of the SSID "ap01" from the list in the SSID screen and accepts input of the password "xxx" of the AP 200 in the input field in the SSID screen. Thereby, the app 38 selects the UUID "bbb3" from the obtained second list and sends a Write Request signal that includes the Handle "n12" corresponding to the selected UUID "bbb3", the SSID "ap01" and the password "xxx" to the printer 100 via the OS 36 in T410. Here, the information in the Write Request signal (that is, the Handle "n12", the SSID "ap01", and the password "xxx") is encrypted by the Key.

Upon receiving the Write Request signal from the terminal 10 in T410, the printer 100 decrypts the information in this signal and obtains the SSID "ap01" and the password "xxx". Then, the printer 100 stores the SSID "ap01" and the password "xxx" as the AValue corresponding to the Handle "n12". Next, the printer 100 sends a Write Response signal to the terminal 10 in T412, and uses the stored SSID "ap01" and the password "xxx" to start an AP connection process for establishing an AP connection and changes the AP state information from "Enable" to "Busy" in T414.

Upon receiving the Write Response signal from the printer 100 via the OS 36 in T412, the app 38 sends a Type_Req signal including the UUID "bbb1" to the printer 100 via the OS 36 in T416. In T416, the app 38 sends the Type_Req signal including the UUID "bbb1" to the printer 100 before the AP connection process is completed. As a result, in T418, the app 38 receives the AP state information "Busy" of the AValue corresponding to the UUID "bbb1" from the printer 100 via the OS 36.

The app 38 can be aware that the AP connection process has not been completed yet because it obtains "Busy", and the app 38 sends the Type_Req signal including the UUID "bbb1" again to the printer 100 via the OS 36 in T422. Here, the AP connection process was completed in T420, and an AP connection has been established between the printer 100 and the AP 200. In FIG. 12, dashed arrows indicate Wi-Fi communication using the AP network (that is, communication via the wireless LAN I/F 114). Upon the AP connection being established, the printer 100 changes the AP state information from "Busy" to "Enable". Thereafter, in T422, the app 38 sends the Type_Req signal including the UUID "bbb1" to the printer 100. As a result, in T424, the app 38 receives the AP state information "Enable" of the AValue corresponding to the UUID "bbb1" from the printer 100 via the OS 36.

Upon receiving the AP state information "Enable" from the printer 100 via the OS 36 in T424, the app 38 sends a Type_Req signal that includes the UUID "bbb2" of the "IP Address" of the AC 138C, and the initial Handle "n5" and the last Handle "n13" of the AC 138C to the printer 100 via the OS 36 in T426. As a result, in T428, the app 38 receives the IP address IA of the AValue corresponding to the UUID "bbb2" from the printer 100 via the OS 36.

Upon obtaining the IP address IA from the OS 36 in T428, the app 38 requests the OS 36 to send a confirmation signal with the IP address IA as its destination in T430. As a result, the OS 36 sends a confirmation signal via the wireless LAN I/F 14 by using the AP network of the AP 200. As described above, the AP connection has been established between the printer 100 and the AP 200. Therefore, the confirmation signal is received by the printer 100 via the AP 200.

Upon receiving the confirmation signal from the AP 200 via the wireless LAN I/F 114 in T430, the printer 100 sends a response signal for the confirmation signal to the terminal 10 via the wireless LAN I/F 114 and the AP 200 in T432.

Upon receiving the response signal from the printer 100 via the OS 36 in T432, the app 38 determines that it is possible to execute communication with the printer 100. T434 to T438B, which are executed after T432, are the same as T256 to T260B of FIG. 10, except that the information in the Write Request signal is encrypted by the Key.

Upon disconnecting the L2CAP Link in T438A, the printer 100 changes the resume flag 162 from "OFF" to "ON" in T440.

Further, upon receiving the Write Response signal from the printer 100 via the OS 36 in T436, the app 38 displays a print screen on the display unit 12 in T450. Then, the app 38 accepts a print operation from the user on the print screen. The print operation includes an operation of selecting an image to be printed and an operation of inputting print settings (paper size, color, etc.).

In T452, the app 38 sends print data that includes image information corresponding to the selected image and setting information indicating the inputted print settings to the printer 100 via the OS 36, the wireless LAN I/F 14, and the AP 200. As a result, the printer 100 prints the image corresponding to the image information received from the terminal 10 in T454 in accordance with the print settings indicated by the setting information received from the terminal 10.

According to the configuration of the present case, the printer 100 changes the resume flag 162 from "ON" to "OFF" (T262) in the case where the AP connection button in the function screen is selected (T200 of FIG. 10). Thereby, the printer 100 does not resume sending the ADV signal after having stopped sending the ADV signal in response to the establishment of the L2CAP Link. Then, the printer 100 executes the authentication communication due to the APer indicating "Readable without authentication when discoverable" and the printer 100 being in the non-Discoverable state (T326 of FIG. 11). As a result, the terminal 10 can encrypt the SSID "ap01" and the password "xxx" of the AP 200 by using the Key and send them to the printer 100 (T410). Therefore, acquisition of the SSID "ap01" and the password "xxx" by a third party can be prevented.

Figure 13:
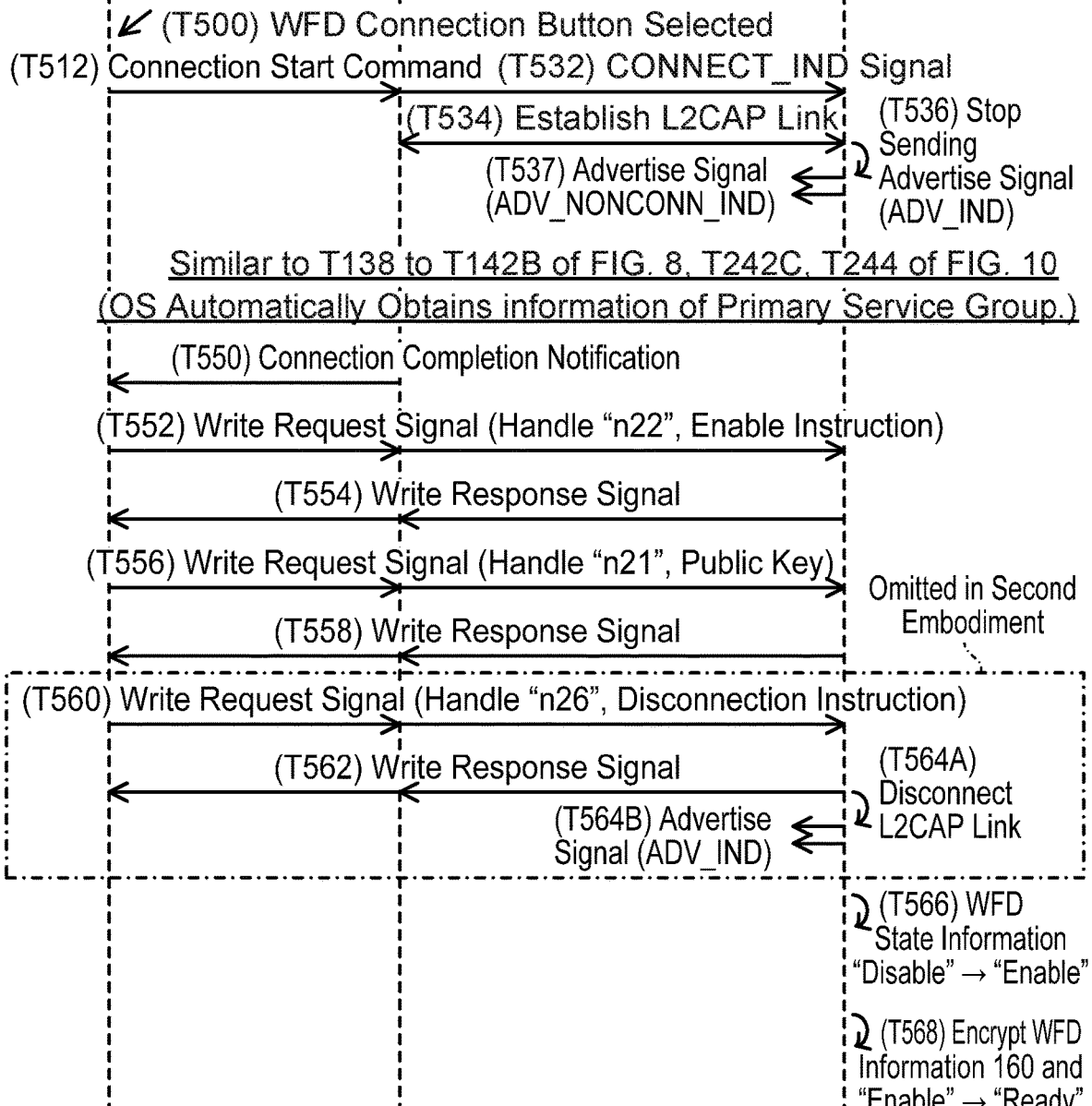
FIG. 13 shows a sequence diagram for a case in which a WFD connection button in the function screen is selected in the first and second embodiments.
Figure 14:
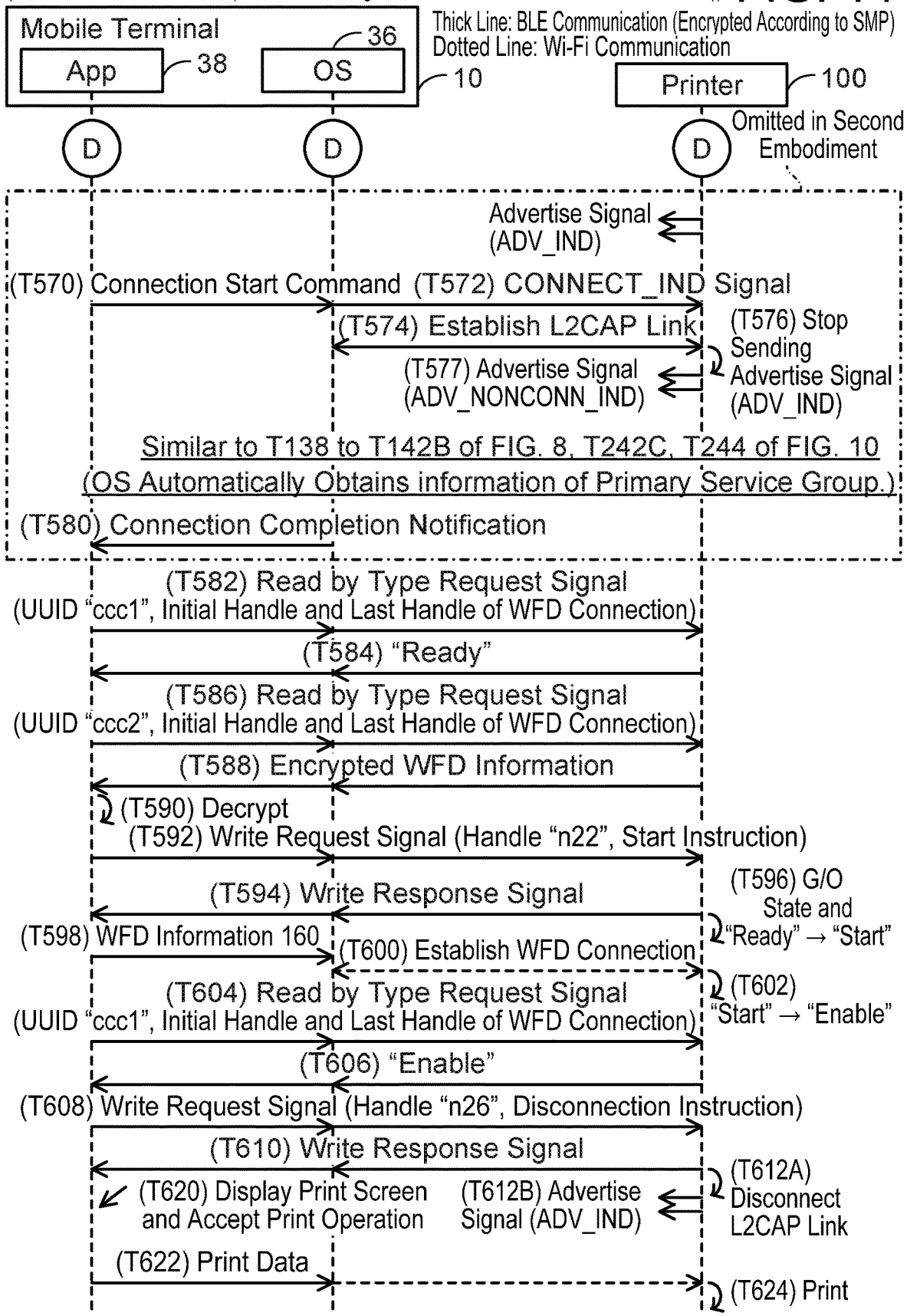
FIG. 14 shows a continuation of FIG. 13.

(Case for WFD Connection; FIG. 13, FIG. 14)

A case in which the WFD connection button of the function screen is selected in the present embodiment will be described with reference to FIG. 13 and FIG. 14. In the present case, the plurality of functions that the printer 100 is capable of executing (that is, the print function, the AP connection, the WFD connection) includes the WFD connection function which is desired by the user. In this case, in T500, the user selects the WFD connection button in the function screen.

Upon accepting selection of the WFD connection button in T500, the app 38 supplies a connection start command to the OS 36 in T512. T532 to T537 are the same as T232 to T237 of FIG. 10 (that is, establishment of the 2CAP Link, resuming of sending of the ADV signal). Then, the OS 36 executes the same communications as those of T138 to T142B of FIG. 8 and T242C and T244 of FIG. 10 (that is, sequential sending of Typ_Req signals corresponding to the PS group). That is, since the printer 100 is in the Discoverable state due to the resuming of the sending of the ADV signal, the Error Response signal is not received and authentication communication according to the SMP is not executed.

Upon obtaining a connection completion notification from the OS 36 in T550 in response to the connection start command of T512, the app 38 obtains a second list that indicates the UUIDs of the Characteristics in the WC 138D from the OS 36. Then, the app 38 sends a Write Request signal that includes the Handle "n22" corresponding to the UUID "ccc4" in the second list and an Enable instruction to the printer 100 via the OS 36 in T552.

Upon receiving the Write Request signal from the terminal 10 in T552, the printer 100 stores the Enable instruction as the AValue corresponding to the Handle "n22" due to the APer corresponding to the Handle "n22" indicating "Writeable without authentication". Then, in T554, the printer 100 sends a Write Response signal to the terminal 10.

Further, in T556, the app 38 sends a Write Request signal that includes the Handle "n21" corresponding to the UUID "ccc3" in the obtained second list and a public key to the printer 100 via the OS 36. The public key may be created by the app 38 in advance at the time when the app 38 is activated, or may be created by the app 38 in the case where the WFD connection button is selected, for example.

Upon receiving the Write Request signal from the terminal 10 in T556, the printer 100 stores the public key as the AValue corresponding to the Handle "n21" due to the APer corresponding to the Handle "n21" indicating "Writeable without authentication". T558 is the same as T554.

T560, T562 are the same as T256, T258 of FIG. 10. Thereby, the disconnect instruction is stored as the AValue corresponding to the Handle "n26".

Upon the Enable instruction, the public key, and the disconnect instruction being stored as the AValues, the printer 100 disconnects in T564A the L2CAP Link established in T534 in accordance with the stored disconnect instruction, and starts sending the ADV signal including the connection allowance parameter "ADV_IND" in T564B. Further, in T566, the printer 100 changes the state of the printer 100 from "Disable" to "Enable" in accordance with the stored Enable instruction. Thereby, the WFD state information is changed from "Disable" to "Enable". Further, in T568, the printer 100 encrypts the WFD information 160 by using the stored public key. Upon completion of the encryption of the WFD information 160, the printer 100 changes the state of the printer 100 from "Enable" to "Ready".

As shown in FIG. 14, upon receiving the Write Response signal from the terminal 10 in T562, the app 38 supplies a connection start command to the OS 36 in T570. T572 to T577 are the same as T532 to T537 of FIG. 13. Then, the OS 36 executes the same communications as those of T138 to T142B of FIG. 8 and T242C and T244 of FIG. 10. That is, as in FIG. 13, authentication communication according to the SMP is not executed.

Upon obtaining a connection completion notification from the OS 36 in T580 in response to the connection start command of T570, the app 38 obtains a second list that indicates the UUIDs of the Characteristics in the WC 138D from the OS 36. Then, the app 38 sends a Type_Req signal that includes the UUID "ccc1" in the second list and the initial Handle "n14" and the last Handle "n22" of the WC 138D to the printer 100 via the OS 36 in T582.

In the present case, at the time when the Type_Req signal is sent to the printer 100 in T582, the WFD state information of the printer 100 has been set in "Ready". Therefore, when the app 38 sends the Type_Req signal to the printer 100 via the OS 36 in T582, the app 38 receives the WFD state information "Ready" corresponding to the UUID "ccc1" from the printer 100 via the OS 36 in T584.

Upon obtaining the WFD state information "Ready" from the OS 36 in T584, the app 38 sends a Type_Req signal that includes the UUID "ccc2" in the obtained second list and the initial Handle "n14" and the last Handle "n22" of the WC 138D to the printer 100 via the OS 36 in T586. As a result, in T588, the app 38 receives the encrypted WFD information from the printer 100 via the OS 36.

In T590, the app 38 decrypts the received encrypted WFD information by using the public key. Thereby, the app 38 obtains the WFD information 160.

In T592, the app 38 sends a Write Request signal that includes the Handle "n22" corresponding to the UUID "ccc4" in the obtained second list and a Start instruction to the printer 100 via the OS 36. As a result, the Start instruction is stored as the AValue corresponding to the Handle "n22", and a Write Response signal is sent to the terminal 10 in T594.

In T596, the printer 100 starts operating in the G/O state in accordance with the stored Start instruction. As a result, the state of the printer 100 is changed from "Ready" to "Start".

Further, in T598, the app 38 supplies the WFD information 160 obtained in T590 to the OS 36 and requests the OS 36 to establish a WFD connection. Thereby, in T600, the OS 36 operates as the client of the WFD scheme and establishes a WFD connection with the printer 100 by using the WFD information 160.

Further, upon establishing the WFD connection with the terminal 10 in T600, the printer 100 changes the state of the printer 100 from "Start" to "Enable" in T602.

Further, upon supplying the WFD information 160 to the OS 36 in T598, the app 38 sends a Type_Req signal including the UUID "ccc1" to the printer 100 via the OS 36 in T604, as in T582. In the present case, the app 38 sends the Type_Req signal including the UUID "ccc1" to the printer 100 after the establishment of the WFD connection has completed. As a result, in T606, the app 38 receives the WFD state information "Enable" of the AValue corresponding to the UUID "ccc1" from the printer 100 via the OS 36.

Upon receiving the WFD state information "Enable" from the printer 100 in T606, the app 38 determines that the establishment of the WFD connection is completed. T608 to T612B, which are executed after T606, are the same as T560 to T564B of FIG. 13.

T620 to T624 are the same as T450 to T454 of FIG. 12, except that the print data is sent directly from the terminal 10 to the printer 100 by using the WFD connection.

According to the configuration of the present case, in the case where the WFD connection button in the function screen is selected (T500 of FIG. 13), the terminal 10 sends the public key to the printer 100 (T556). Thereby, the printer 100 encrypts the WFD information 160 (T568). Then, the printer 100 sends the encrypted WFD information to the terminal 10 (T588 of FIG. 14). As such, acquisition of the WFD information 160 by a third party can be prevented.

Further, according to the configuration of the present case, the printer 100 resumes sending the ADV signal after the L2CAP Link has been established (T537 of FIG. 13). Due to the APer indicating "Readable without authentication when discoverable" and the printer 100 being in the Discoverable state, the public key is sent to the printer 100 (T556) without executing authentication communication according to the SMP. As such, encryption by using the Key of the SMP can be prevented when encryption by using the public key is to be executed.

Figure 15:
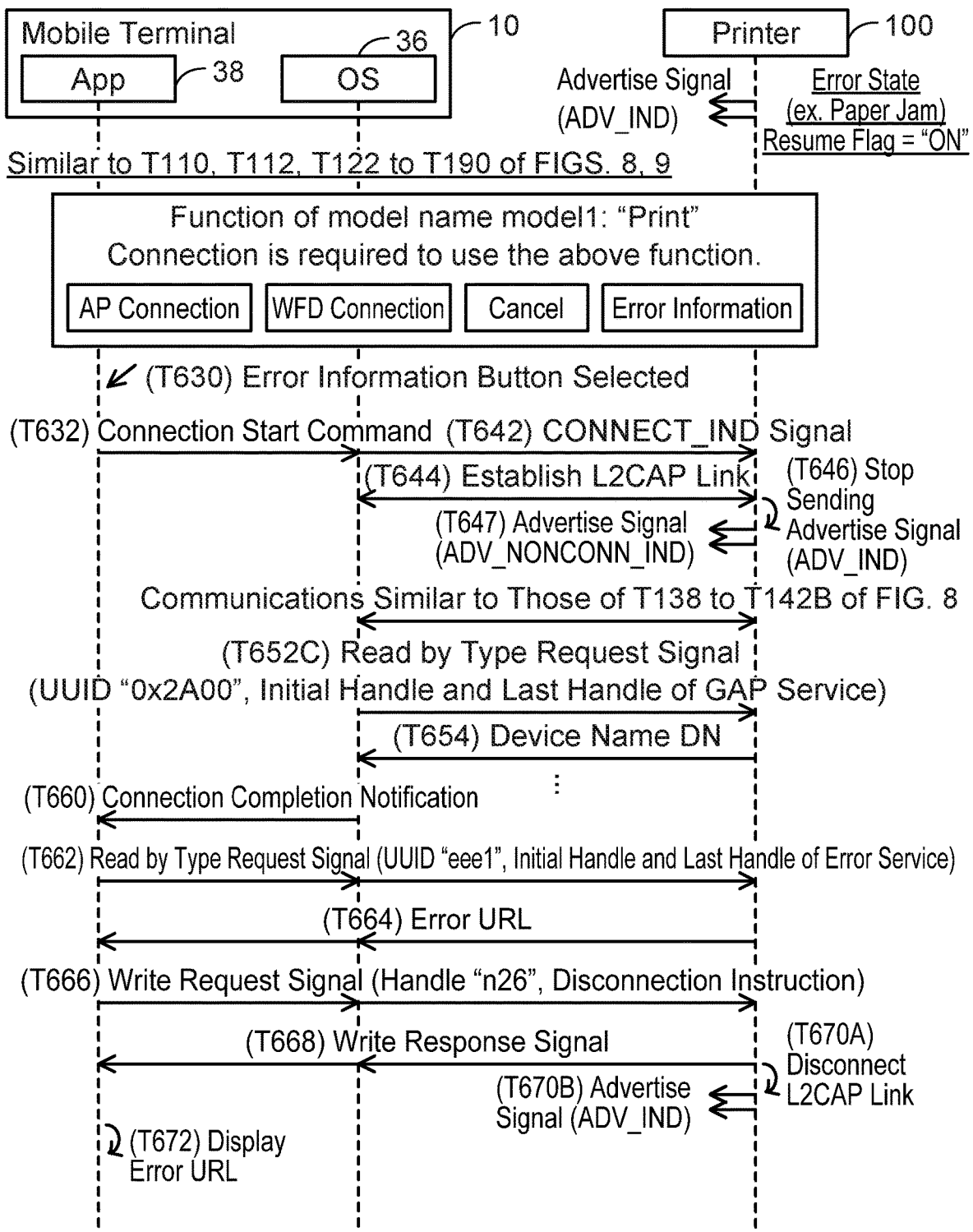
FIG. 15 shows a sequence diagram for a case in which an error information button in the function screen is selected in the first to fifth embodiments.

(Case for Error Information; FIG. 15)

A case in which the error information button in the function screen is selected in the present embodiment will be described with reference to FIG. 15. In the present case, the user selects the error information button in the function screen in order to check whether the printer 100 is in an error state or not.

Upon accepting selection of the error information button in T630, the app 38 supplies a connection start command to the OS 36 in T632. T642 to T647 are the same as T232 to T237 of FIG. 10. Then, the OS 36 executes the same communications as those of T138 to T142B of FIG. 8 and T652C, T654 which are same as T242C and T244 of FIG. 10. That is, as in FIG. 10, authentication communication according to the SMP is not executed.

Upon obtaining a connection completion notification from the OS 36 in T660 in response to the connection start command of T632, the app 38 obtains a second list that indicates the UUID of the Characteristic in the ES 138F from the OS 36. Then, the app 38 sends a Type_Req signal that includes the UUID "eee1" in the second list and the initial Handle "n28" and the last Handle "n30" of the ES 138F to the printer 100 via the OS 36 in T662.

In the present case, at the time when the Type_Req signal is sent to the printer 100 in T662, the state of the printer 100 is the error state (e.g., paper jam). Therefore, when the app 38 sends the Type_Req signal to the printer 100 in T662, the app 38 receives an error URL corresponding to the UUID "eee1" from the printer 100 via the OS 36 in T664.

T666 to T670B, which are executed after T664, are the same as T256 to T260B of FIG. 10. That is, the L2CAP Link established in T644 is disconnected.

Upon obtaining the Write Response signal from the OS 36 in T668, the app 38 displays the error URL on the display unit 12 in T672. By selecting the displayed error URL, the user can see a Web page that describes a method for resolving the error state (e.g., paper jam).

According to the configuration of the present case, in the case where the error information button in the function screen is selected (T630), the printer 100 resumes sending the ADV signal after the L2CAP Link has been established (T647). Due to the APer indicating "Readable without authentication when discoverable" and the printer 100 being in the Discoverable state, the error URL is sent to the terminal 10 (T664) without executing authentication communication according to the SMP. An error URL, which is less confidential than the SSID "ap01" and the password "xxx", can be sent to the terminal 10 without executing authentication communication according to the SMP.

(Correspondence Relationships)

The printer 100, the terminal 10, the BT I/F 116, the wireless LAN I/F 114 are examples of "function executing device", "terminal device", "first wireless interface", "second wireless interface", respectively. The function of establishing an AP connection or the function of establishing a WFD connection is an example of "first function". The function screen of T190 of FIG. 9, the selection of the AP connection button or the WFD connection button in the function screen, and the function information FI are examples of "function screen", "first execution instruction", and "screen display information", respectively. The print data is an example of "relation data". The connection allowance parameter "ADV_IND" and the connection non-allowance parameter "ADV_NONCONN_IND" are examples of "allowance information" and "non-allowance information", respectively. The Scan start command and the connection start command are examples of "first command" and "second command (and command)", respectively. The L2CAP Link of T134 of FIG. 8 is an example of "first wireless connection". The function of sending an error URL, the selection of the error information button in the function screen, and the Type_Req signal of T662 of FIG. 15 are examples of "second function", "second execution instruction", and "second function execution information", respectively. The L2CAP Link of T644 of FIG. 15 is an example of "fifth wireless connection (and specific wireless connection)".

The correspondence relationships for FIG. 10 to FIG. 12 (the case for the AP connection) are as follows. The PIN code and the encrypted information are examples of "specific authentication information (and first (or second) code)" and "related information", respectively. The printer 100 and the terminal 10 are examples of "one device" and "other device", respectively. The AP 200 is an example of "external device". In one aspect, the L2CAP Link of T334 of FIG. 11 and the L2CAP Link of T234 of FIG. 10 are examples of "second wireless connection" and "third wireless connection", respectively. In another aspect, the L2CAP Link of T234 of FIG. 10 and the L2CAP Link of T334 of FIG. 11 are examples of "first wireless connection" and "second wireless connection", respectively. The state where the resume flag is "ON" and the state where the resume flag is "OFF" are examples of "first state" and "second state", respectively. The resume flag OFF instruction of T252 of FIG. 10 is an example of "execution request (and setting change request)". The Type_Req signals are an example of "specific Read request". The SSID "ap01" and the password "xxx" of T410 of FIG. 12 are an example of "first function execution information".

The correspondence relationships for FIG. 13 and FIG. 14 (the case for the WFD connection) are as follows. The public key and the PIN code are examples of "specific authentication information" and "specific code", respectively. The terminal 10 and the printer 100 are examples of "one device" and "other device", respectively. The terminal 10 is an example of "external device". In one aspect, the L2CAP Link of T534 of FIG. 13 and the L2CAP Link of T574 of FIG. 14 are examples of "second wireless connection" and "fourth wireless connection", respectively. In another aspect, the L2CAP Link of T534 of FIG. 13 and the L2CAP Link of T574 of FIG. 14 are examples of "first wireless connection" and "third wireless connection", respectively. The encrypted WFD information of T588 of FIG. 14 is an example of "first function execution information". The Write Request signal including the public key of T556 of FIG. 13 is an example of "execution request".

In one aspect, T134 of FIG. 8 and T184 of FIG. 9 are examples of "establish a first wireless connection" and "send screen display information", respectively. In the case of the AP connection, T334 of FIG. 11, T362 of FIG. 11, and T410 of FIG. 12 are examples of "establish a second wireless connection", "execute the communication using the specific authentication information", and "execute communication of first function execution information", respectively. In the case of the WFD connection, T534 of FIG. 13, T556 of FIG. 13, and T588 of FIG. 14 are examples of "establish a second wireless connection", "execute the communication using the specific authentication information", and "execute communication of first function execution information", respectively. T112 of FIG. 8, T184 of FIG. 9, and T190 of FIG. 9 are examples of "supply a first command", "receive screen display information", and "cause a display unit of the terminal device to display the function screen", respectively. In the case of the AP connection, T312 of FIG. 11 and T410 of FIG. 12 are examples of "supply a second command" and "execute communication of first function execution information", respectively. In the case of the WFD connection, T512 of FIG. 13 and T588 of FIG. 14 are examples of "supply a second command" and "execute communication of first function execution information", respectively.

In another aspect, in the case of the AP connection, T234 of FIG. 10, T252 of FIG. 10, T362 of FIG. 11, and T410 of FIG. 12 are examples of "establish a first wireless connection", "receive an execution request", "execute the target process", and "execute communication of first function execution information", respectively. In the case of the WFD connection, T534 of FIG. 13, T556 of FIG. 13, T568 of FIG. 13, and T588 of FIG. 14 are examples of "establish a first wireless connection", "receive an execution request", "execute the target process", and "execute communication of first function execution information", respectively. T184 of FIG. 9 and T190 of FIG. 9 are examples of "receive screen display information" and "cause a display unit of the terminal device to display the function screen", respectively. In the case of the AP connection, T212 of FIG. 10 and T410 of FIG. 12 are examples of "supply a command" and "execute communication of first function execution information", respectively. In the case of the WFD connection, T512 of FIG. 13 and T588 of FIG. 14 are examples of "supply a command" and "execute communication of first function execution information", respectively.

Second Embodiment (Case for WFD connection; FIG. 13, FIG. 14)

The second embodiment is a variant of the first embodiment. The second embodiment is the same as the first embodiment, except that a part of the processes for the case of WFD connection is different. In the present embodiment, the app 38 and the printer 100 do not execute the processes of T560 to T564B of FIG. 13 or the processes of T570 to T580 of FIG. 14. That is, the printer 100 does not disconnect the L2CAP Link established in T534 and encrypts the WFD information 160 in a state where the establishment of this Link is maintained (T568). Then, the printer 100 sends the encrypted WFD information to the terminal 10 by using the L2CAP Link of T534 (T588).

The present embodiment assumes that the processing capacity of the CPU 132 of the printer 100 is relatively high. In a case where the processing capacity of the CPU 132 is relatively high, the CPU 132 can encrypt the WFD information 160 while the establishment of the L2CAP Link is maintained. For example, in a case where the processing capacity of the CPU 132 is relatively low, the CPU 132 cannot encrypt the WFD information 160 while the establishment of the L2CAP Link is maintained. In such a case, it is effective to adopt a configuration in which the WFD information 160 is encrypted after the L2CAP Link is disconnected, as in the first embodiment (see T564A of FIG. 13). By contrast, the present embodiment takes into account that the processing capacity of the CPU 132 is relatively high and therefore omits the processes of disconnecting the L2CAP Link and re-establishing the L2CAP Link (that is, the processes of T560 of FIG. 13 to T580 of FIG. 14). This can prevent execution of the unnecessary processes.

Figure 16:
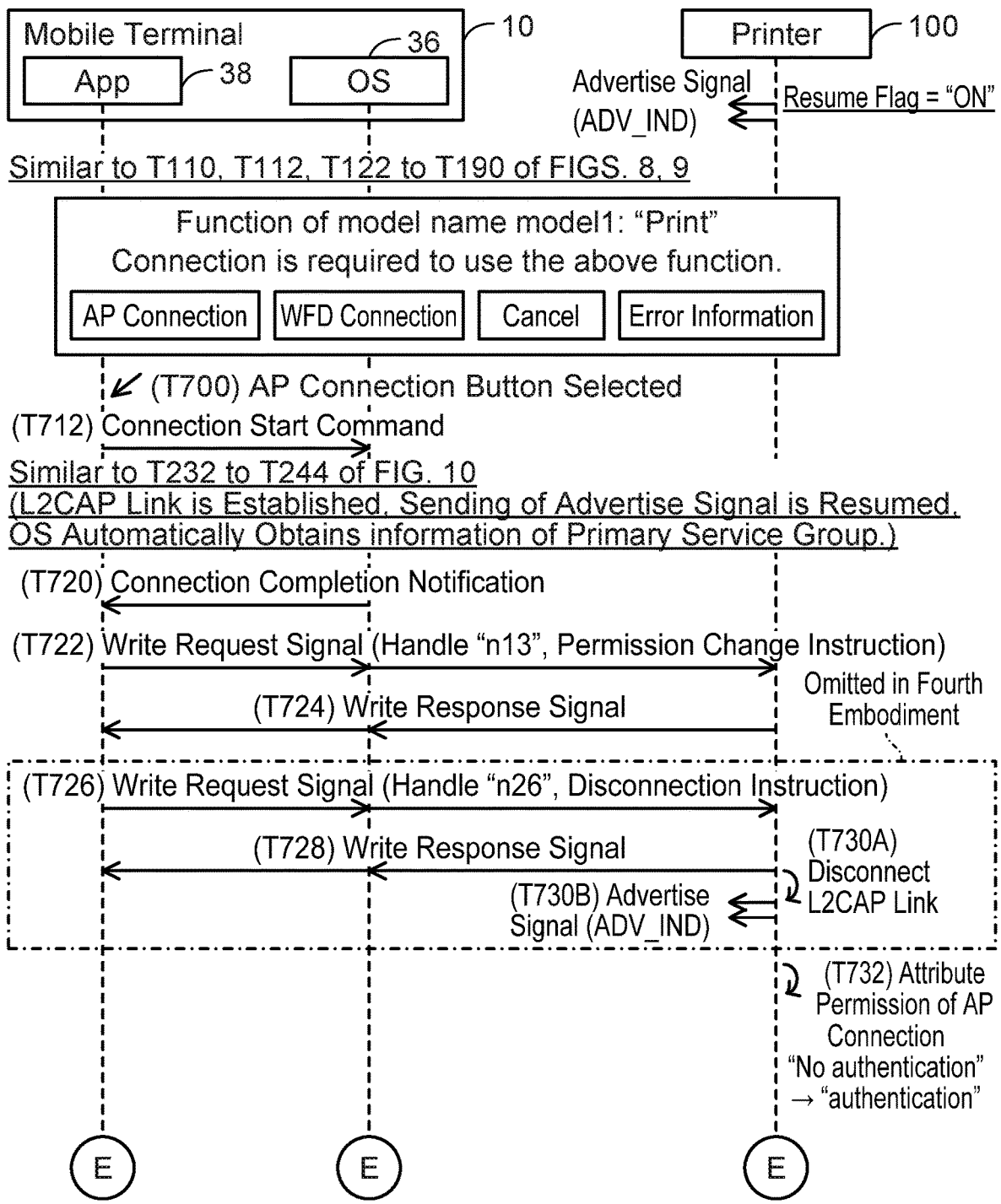
FIG. 16 shows a sequence diagram for a case in which the AP connection button in a function screen is selected in the third and fourth embodiments.
Figure 17:
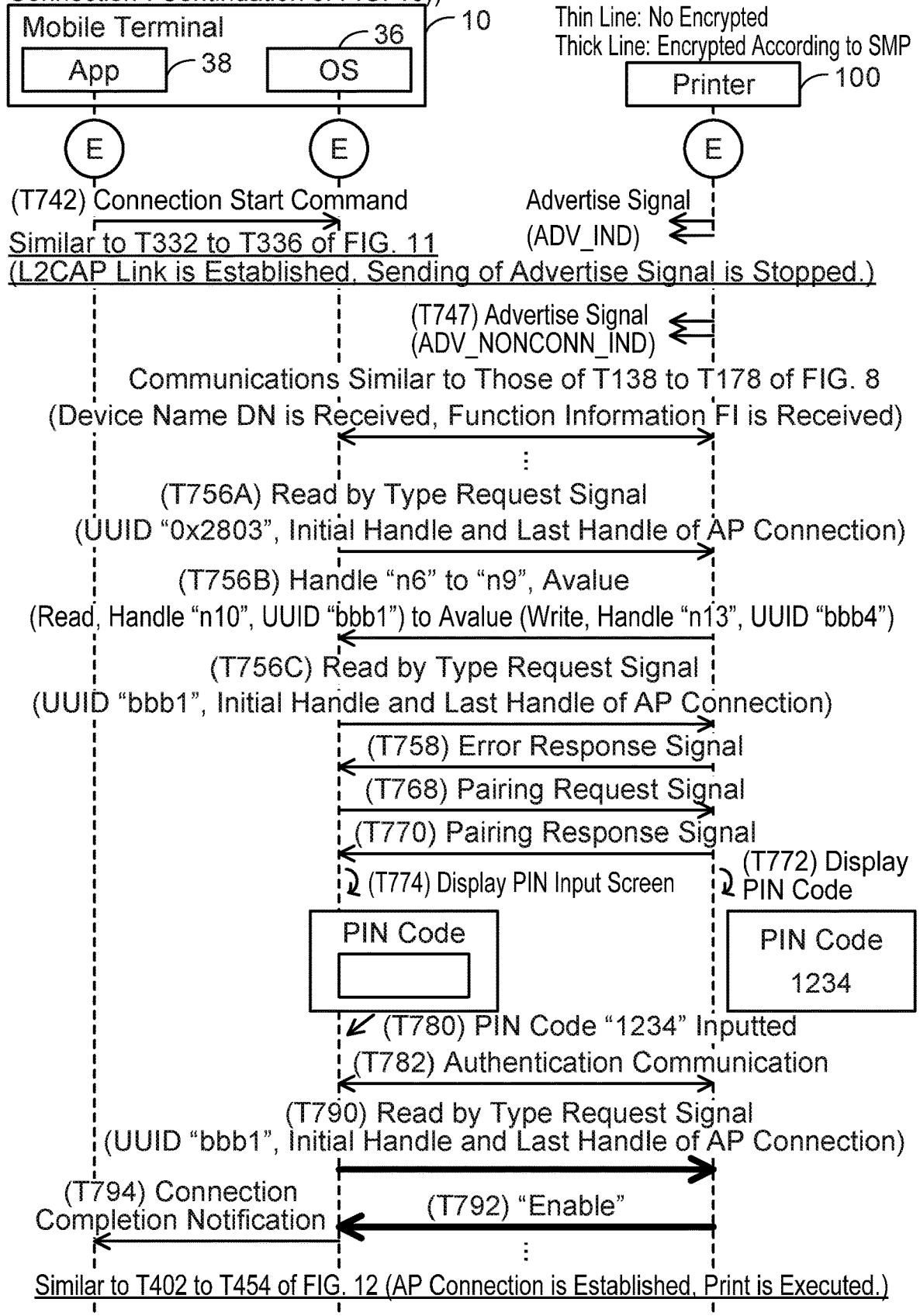
FIG. 17 shows a continuation of FIG. 16 in the third embodiment.

Third Embodiment (Case for AP connection; FIG. 16, FIG. 17)

The third embodiment is the same as the first embodiment, except that a part of the processes for the case of AP connection is different.

T700 to T720 are the same as T200 to T250 of FIG. 10 (that is, establishment of the 2CAP Link, resuming of the sending of the ADV signal, that is, sequential sending of the Typ_Req signals corresponding to the PS group). That is, since the printer 100 is in the Discoverable state due to it resuming sending the ADV signal, the Error Response signal is not received and authentication communication according to the SMP is not executed.

Upon obtaining the connection completion notification from the OS 36 in T720 in response to the connection start command of T712, the app 38 obtains a second list that indicates the UUIDs of the Characteristics in the AP 138C from the OS 36. Then, the app 38 sends a Write Request signal that includes the Handle "n13" corresponding to the UUID "bbb4" in this second list and a Permission change instruction to the printer 100 via the OS 36 in T722. This Permission change instruction is an instruction for changing values indicating "Readable without authentication" in the AP 138C to values indicating "Readable with authentication" as well as for changing values indicating "Writeable without authentication" in the AP 138C to values indicating "Writeable with authentication". Specifically, this instruction is an instruction for changing the value indicating "No authentication required" to the value indicating "Authentication required". In a variant, according to this instruction, the value indicating "No encryption required" may be changed to the value indicating "Encryption required", or the value indicating "No authorization required" may be changed to the value indicating "Authorization required". Here, "Readable with authentication" means that information can be read out on condition that the information is encrypted according to the SMP, Further, "Writeable with authentication" means that information can be written on condition that the information is encrypted according to the SMP. In a variant, not all the values of the data in the AP 138O may be changed, but only the values indicating "Readable without authentication" in at least one piece of data (e.g., the data corresponding to the Handle "n10") among the data in the AP 138C may be changed to values indicating "Readable with authentication".

Upon receiving the Write Request signal from the terminal 10 in T722, the printer 100 stores the Permission change instruction as the AValue corresponding to the Handle "n13" due to the APer corresponding to the Handle "n13" indicating "Writeable without authentication". Then, in T724, the printer 100 sends a Write Response signal to the terminal 10.

T726, T728 are the same as T256, T258 of FIG. 10. Thereby, the disconnect instruction is stored as the AValue corresponding to the Handle "n26".

Upon the Permission change instruction and the disconnect instruction being stored as the AValues, the printer 100 disconnects in T730A the L2CAP Link that was established in response to the connection start command of T712 in accordance with the stored disconnect instruction and starts sending the ADV signal including the connection allowance parameter "ADV_IND" in T730B. Further, in accordance with the stored Permission change instruction, the printer 100 changes the values indicating "Readable without authentication" in the APers corresponding to the Handles "n10" and "n11" to the values indicating "Readable with authentication", and also changes the values indicating "Writeable without authentication" in the APers corresponding to the Handles "n12" and "n13" to the values indicating "Writeable with authentication" in T732.

As shown in FIG. 17, upon receiving the Write Response signal from the printer 100 in T728, the app 38 supplies a connection start command to the OS 36 in T742. Thereby, the same processes as T332 to T336 of FIG. 11 are executed (that is, establishment of the L2CAP Link and stop on the sending of the ADV signal).

Since the resume flag 162 indicates "ON", the printer 100 resumes sending the ADV signal in T747. That is, the printer 100 again shifts to the Discoverable state.

Further, the OS 36 uses the L2CAP Link established in response to the connection start command of T712 to execute the same communications as those of T138 to T178 of FIG. 8 (that is, sending of a Group_Req signal, sending of a Type_Req signal including the UUID "0x2803", sending of a Type_Req signal corresponding to the GA 138A, and sending of a Type_Req signal corresponding to the FS 138B).

Due to the APer of the GA 138A indicating "Readable without authentication when discoverable" and the printer 100 being in the Discoverable state, the app 38 receives the device name DN from the printer 100. Further, due to the APer of the FS 138B indicating "Readable without authentication", the app 38 receives the function information FI from the printer 100.

Upon receiving the function information FI from the printer 100, the OS 36 sends a Type_Req signal to the printer 100 in T756A for the AC 138C, which is the PS corresponding to the Handle "n5" which has the second smallest value after the Handle "n1". This signal includes the UUID "0x2803", the initial Handle "n5" of the AC 138C, and the last Handle "n13" of the AC 138C.

Upon receiving the Type_Req signal from the terminal 10 in T756A, the printer 100 specifies the Handles "n6" to "n9" corresponding to the UUID "0x2803" included in the Type_Req signal from among the data group included within the Handle range indicated by the initial Handle "n5" and the last Handle "n13" included in the Type_Req signal. Due to the APers corresponding to the specified Handles "n6" to "n9" indicating "Readable without authentication", the printer 100 sends in T756B, to the terminal 10, the specified Handles "n6" to "n9" and the AValues corresponding to the specified Handles "n6" to "n9" (from the property "Read", Handle "n10", and UUID "bbb1" to the property "Write", Handle "n13", and UUID "bbb4").

Upon receiving the Handles and the AValues from the printer 100 in T756B, the OS 36 sends in T756C, to the printer 100, a Type_Req signal that includes the UUID "bbb1" corresponding to the Handle "n10" which has the smallest value among the AValues. This signal further includes the initial Handle "n5" of the AC 138C and the last Handle "n13" of the AC 138C.

Upon receiving the Type_Req signal from the terminal 10 in T756C, the printer 100 specifies the Handle "n10" corresponding to the UUID "bbb1" included in the Type_Req signal from among the data group included within the Handle range indicated by the initial Handle "n5" and the last Handle "n13" included in this signal. Here, the APer corresponding to the specified Handle "n10" indicates "Readable with authentication". At the current point of time, the Key for encrypting information according to the SMP has not been created yet. For this reason, the printer 100 cannot encrypt information according to the SMP, and therefore sends an Error Response signal to the terminal 10 in T758.

T768 to T782 are the same as T348 to T362 of FIG. 11. Thereby, in below-described processes from T790 onward, information communicated between the OS 36 and the printer 100 according to the BT scheme is encrypted by the Key.

Upon completion of the authentication communication of T782, the OS 36 sends again the same Type_Req signal as that of T756 to the printer 100 in T790. It should be noted that, as described above, the information in this Type_Req signal is encrypted by the Key.

At the time of receiving the Type_Req signal from the terminal 10 in T790, the printer 100 can encrypt information according to the SMP because the Key has already been created. As such, due to the APer indicating "Readable with authentication", the printer 100 encrypts the AP state information (here, "Enable") by using the Key and sends the encrypted AP state information to the terminal 10 in T792. T794 is the same as T380 of FIG. 11.

When the connection completion notification is obtained from the OS 36 in T794, the same processes as T402 to T454 of FIG. 12 are executed. Thereby, establishment of an AP connection and printing are executed.

According to the configuration of the present embodiment, the printer 100 changes the APers of the AC 138C from "Readable without authentication" to "Readable with authentication" (T732) in the case where the AP connection button in the function screen is selected (T700 of FIG. 16). Thereby, the printer 100 executes the authentication communication (T782 of FIG. 17) due to the APers of the AC 138C indicating "Readable with authentication". As a result, as in the first embodiment, the terminal 10 can encrypt the SSID "ap01" and the password "xxx" of the AP 200 by using the Key and send them to the printer 100. Therefore, acquisition of the SSID "ap01" and the password "xxx" by a third party can be prevented.

(Correspondence Relationship)

The state where the resume flag is "ON" and the APer indicates "Readable without authentication", and the state where the resume flag is "ON" and the APer indicates "Readable with authentication" are examples of "first state" and "second state", respectively. "Readable without authentication" and "Readable with authentication" are examples of "first setting information" and "second setting information", respectively. The Permission change instruction of T722 of FIG. 16 is an example of "execution request (setting change request)". In one aspect, the L2CAP Link of T334 of FIG. 11 cited in FIG. 17 and the L2CAP Link of T234 of FIG. 10 cited in FIG. 16 are examples of "second wireless connection" and "third wireless connection", respectively. In another aspect, the L2CAP Link of T234 of FIG. 10 cited in FIG. 16 and the L2CAP Link of T334 of FIG. 11 cited in FIG. 17 are examples of "first wireless connection" and "second wireless connection", respectively. In one aspect, T782 of FIG. 17 is an example of "execute the communication using the specific authentication information" of "function executing device", and T742 of FIG. 17 is an example of "supply a second command" of "terminal device". In another aspect, T782 of FIG. 17 is an example of "execute the target process" of "function executing device", and T742 of FIG. 17 is an example of "supply a command" of "terminal device".

Figure 18:
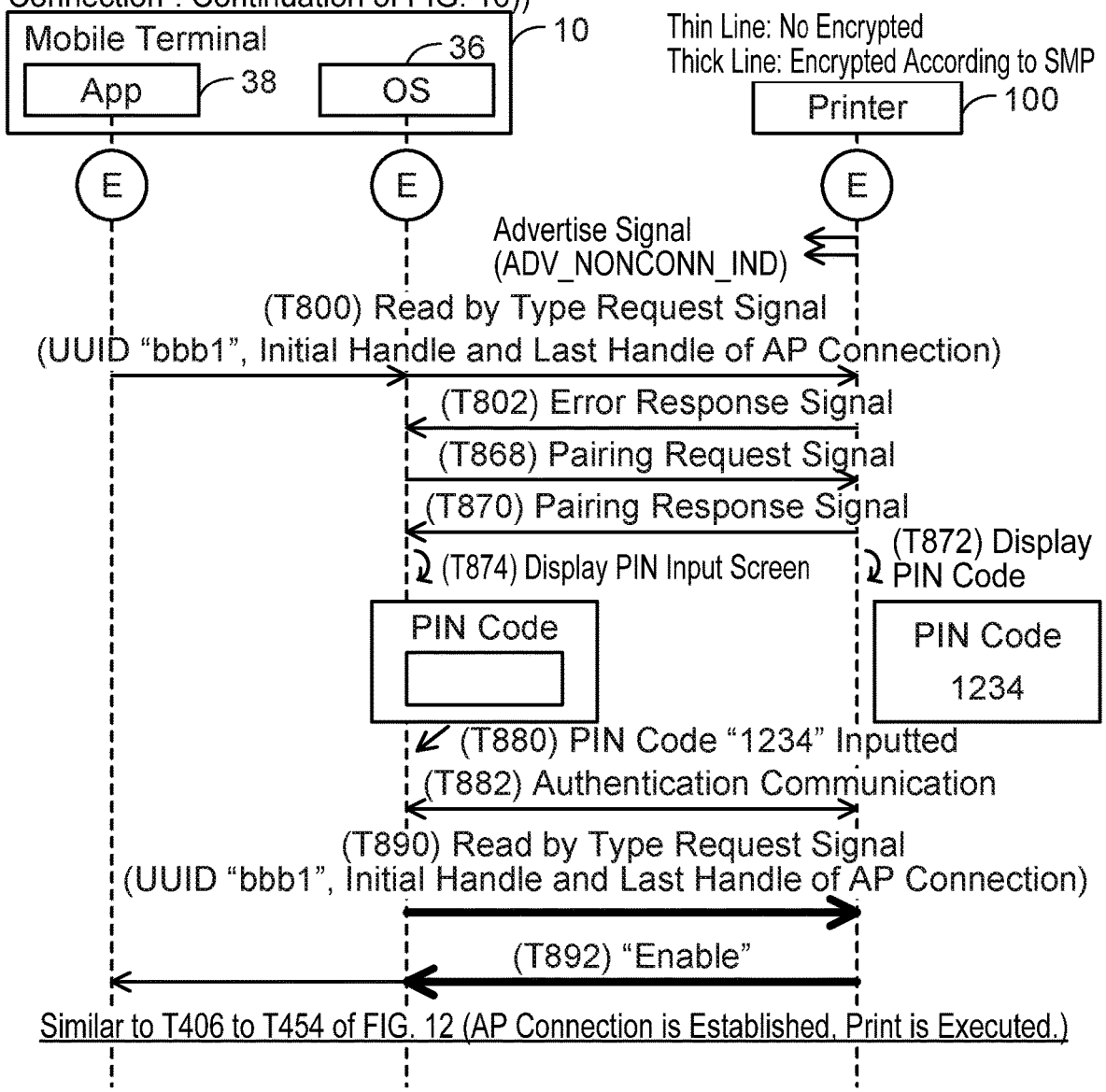
FIG. 18 shows a continuation of FIG. 16 in the fourth embodiment.

Fourth Embodiment (Case for AP Connection; FIG. 16, FIG. 18)

The fourth embodiment is a variant of the third embodiment. The fourth embodiment is the same as the third embodiment, except that a part of the processes for the case of AP connection is different.

As shown in FIG. 16, in the present embodiment, the app 38 and the printer 100 do not execute the processes of T726 to T730B of FIG. 16. That is, the printer 100 does not disconnect the L2CAP Link that was established in response to the connection start command of T712, and changes the APers of the AC 1380 to "Readable with authentication (or Writeable with authentication)" in a state where the establishment of this Link is maintained (T732).

Upon receiving the Write Response signal in T728, the app 38 executes a process of T800, as shown in FIG. 18. T800 is the same as T402 of FIG. 12, except that encryption by using the Key is not executed.

Upon receiving the Type_Req signal from the terminal 10 in T800, the printer 100 specifies the Handle "n10" corresponding to the UUID "bbb1" included in the Type_Req signal from among the data group included within the Handle range indicated by the initial Handle "n5" and the last Handle "n13" included in the Type_Req signal. Here, the APer corresponding to the specified Handle "n10" indicates "Readable with authentication". At this point of time, the Key for encrypting information according to the SMP has not been created yet. For this reason, the printer 100 cannot encrypt information according to the SMP, and therefore sends an Error Response signal to the terminal 10 in T802.

T868 to T882 are the same as T768 to T782 of FIG. 17. Upon completion of the authentication communication of T882, the OS 36 sends again the same Type_Req signal as that of T800 to the printer 100 in T890. It should be noted that, as described above, the information in this Type_Req signal is encrypted by the Key. As a result, in T892, the OS 36 receives the AP state information (here, "Enable") encrypted by the Key from the printer 100 and supplies the received information to the app 38.

When the encrypted AP state information is obtained from the OS 36 in T892, the same processes as T406 to T454 of FIG. 12 are executed. Thereby, establishment of an AP connection and printing are executed.

The present embodiment assumes that the processing capacity of the CPU 132 of the printer 100 is relatively high. In a case where the processing capacity of the CPU 132 is relatively high, the CPU 132 can change the values in the APers in a state where establishment of the L2CAP Link is maintained. For example, in a case where the processing capacity of the CPU 132 is relatively low, the CPU 132 cannot change the values in the APers in the state where establishment of the L2CAP Link is maintained. In such a case, it is effective to adopt a configuration in which the values in the APers are changed after the L2CAP Link is disconnected, as in the third embodiment. By contrast, the present embodiment takes into account that the processing capacity of the CPU 132 is relatively high and therefore omits the processes of disconnecting the L2CAP Link and re-establishing the L2CAP Link. This can prevent execution of the unnecessary processes.

(Correspondence Relationships)

In one aspect, the L2CAP Link of T234 of FIG. 10 cited in FIG. 16 is an example of "second wireless connection". T882 of FIG. 18 is an example of "execute the communication using the specific authentication information" of "function executing device", and T712 of FIG. 16 is an example of "supply a second command" of "terminal device". In another aspect, the L2CAP Link of T234 of FIG.

10 cited in FIG. 16 is an example of "first wireless connection". T882 of FIG. 18 is an example of "execute the target process" of "function executing device", and T712 of FIG. 16 is an example of "supply a command" of "terminal device".

Fifth Embodiment

The fifth embodiment is the same as the first embodiment, except that it is possible to execute printing by using BLE communication. As shown in FIG. 9 and FIG. 10, in the present embodiment, a BLE connection button is included in the function screen. The BLE connection button is a button for accepting an instruction to execute encryption by using a Key of the BLE and to send print data to the printer 100. Further, although illustration is omitted, a PS group of the present embodiment includes, in addition to the PSs 138A to 138F, a PS for receiving print data from the terminal 10 (hereinafter termed "PPS"). The PPS includes a Characteristic that defines reception (that is, writing) of print data.

(Case for Printing; FIG. 10, FIG. 11)
In the present case, the plurality of functions that the printer 100 is capable of executing (that is, the print function, the AP connection, the WFD connection) includes the print function which is desired by the user. In this case, in T200, the user selects the BLE connection button in the function screen.

In the present case, in T200, the app 38 accepts selection of the BLE connection button. Thereby, as in the first embodiment, the processes of T212 to T262 and the processes of T312 to T380 of FIG. 11 are executed.

Upon obtaining the connection completion notification from the OS 36 in T380, the app 38 displays a print screen on the display unit 12 in T390. Then, the app 38 accepts a print operation from the user in the print screen.

In T392, the app 38 obtains a second list of the PPS from the OS 36 and sends, to the printer 100 via the OS 36, a Write Request signal that includes a Handle corresponding to the UUID in the second list and print data. Here, the print data in this signal is encrypted by the Key.

Upon receiving the Write Request signal from the terminal 10 in T392, the printer 100 decrypts the information in the Write Request signal and obtains the print data in T394. Then, the printer 100 prints an image corresponding to image information in the print data in accordance with the print settings in the print data.

According to the present case, the terminal 10 can encrypt the print data by using the Key and send it to the printer 100 (T392). Therefore, acquisition of the information in the print data by a third party can be prevented.

(Correspondence Relationships)
The print function, the selection of the BLE connection button in the function screen, and the print data of T392 are examples of "first function", "first execution instruction", and "first function execution information", respectively.

(Variant 1) "Function executing device" may not be the printer 100, but may be, for example, a scanner, a FAX device, or a multi-function device. For example, in a case where "function executing device" is a scanner, the scanner may receive a scan request from the terminal 10 in T392 of FIG. 11 in the case where the BLE connection button in the function screen is selected in T200 of FIG. 10. Then, in T394, the scanner may execute scan according to the scan settings in the scan request to create scan data, encrypt the created scan data by using the Key, and send it to the terminal 10. In the present variant, the scan data and the function of sending the scan data are examples of "first function execution information" and "first function", respectively.

(Variant 2) "Terminal device" may not be the terminal 10, but may be a stationary terminal device such as a desktop PC.

(Variant 3) "First wireless interface" may not be the BT I/F, but may be an I/F configured to execute wireless communication according to a communication scheme other than the BT scheme (e.g., Zigbee (registered trademark) scheme, Wi-Fi scheme). For example, in a case where the "first wireless interface" is an I/F configured to execute wireless communication according to the Wi-Fi scheme, a PIN code according to WPS (Wi-Fi Protected Setup) scheme is an example of "specific authentication information".

(Variant 4) In the above embodiments, the terminal 10 receives the function information FI from the printer 100 (T184 of FIG. 9), and displays the function screen that includes the character information indicated by the function information FI (T190). Instead, the terminal 10 may receive specific information (e.g., model name) from the printer 100 and may use the received specific information to specify the function information FI corresponding to the printer 100 from the plural pieces of function information stored in the terminal 10. Then, the terminal 10 may display a function screen that includes character information indicated by the specified function information FI. In the present variant, the specific information is an example of "screen display information".

(Variant 5) In the above first embodiment, the printer 100 displays the PIN code "1234" (T352 of FIG. 11), and the terminal 10 receives input of the PIN code "1234" (T360). Instead, the printer 100 may display a code image (e.g., bar code, QR code (registered trademark)) in which the PIN code "1234" has been encoded, and the terminal 10 may decrypt this code image to obtain the PIN code "1234". Further, the terminal 10 may use NFC (Near field communication) communication or the like to obtain the PIN code "1234" from an IC tag of the printer 100.

(Variant 6) In the above first embodiment, the printer 100 prepares the PIN code "1234" (T352 of FIG. 11). Instead, the terminal 10 may prepare the PIN code "1234", and this PIN code "1234" may be inputted to the printer 100. Generally speaking, "specific authentication information" and "first code" may be prepared by one device among the function executing device and the terminal device. Further, for example, in a case where the terminal 10 prepares the PIN code "1234", the printer 100 sends the Pairing Request signal to the terminal 10 and receives the Pairing Response signal from the terminal 10 before executing the authentication communication according to the SMP. Then, in response to receiving the Pairing Response signal, the printer 100 executes the authentication communication according to the SMP. In the present variant, the Pairing Response signal is an example of "execution request".

(Variant 7) In the above first embodiment, the printer 100 operates as the G/O, and the terminal 10 prepares the public key (T556 of FIG. 13). Instead, the terminal 10 may operate as the G/O, and the printer 100 may prepare a public key. Then, the terminal 10 may encrypt the WFD information stored in the terminal 10 by using the public key received from the printer 100. Generally speaking, "specific authentication information" and "public key" may be prepared by one device among the function executing device and the terminal device.

(Variant 8) "specific Read request" may not be the Type_Req signal, but may be another signal defined by the ATT (e.g., Read Request signal, Read Blob Request signal, Read Multiple Request signal).

(Variant 9) In the above embodiments, the app 38 sends the Write Request signal to the printer 100 in T186 of FIG. 9, etc. Instead, the app 38 may send another signal defined by the ATT (e.g., Write Command signal, Signed Write Command signal) to the printer 100.

(Variant 10) In the above first embodiment, in the case where the error information button is selected in the function screen (T630 of FIG. 15), the printer 100 sends the error URL to the terminal 10 without encrypting the information according to the SMP (T664). Instead, for example, a print button may be included in the function screen, and in a case where the print button in the function screen is selected, the printer 100 may receive print data from the terminal 10 without encryption of the information according to the SMP. In the present variant, the print function and the print data are examples of "second function" and "second function execution information".

(Variant 11) In the above first embodiment, the terminal 10 displays the error URL (T672 of FIG. 15). Instead, the terminal 10 may display a message indicating the error state. In the present variant, this message is an example of "error information". Further, the terminal 10 may receive specific information (e.g., a number indicating the type of error) from the printer 100 and use the received specific information to specify an error URL that corresponds to the current error state of the printer 100 from among a plurality of error URLs stored in the terminal 10. Then, the terminal 10 may display the specified error URL. In the present variant, the specific information is an example of "error display information".

(Variant 12) In the above fourth embodiment, the printer 100 receives the Permission change instruction from the terminal 10 (T722 of FIG. 16) and changes the value in the APer (T732). Instead, the printer 100 may receive from the terminal 10 a stop instruction for stopping the sending of the ADV signal and may stop the sending of the ADV signal in accordance with the received stop instruction. Then, instead of T800 of FIG. 18, the printer 100 may receive a Type_Req signal including the UUID "0x2A00" from the terminal 10. Thereby, authentication communication may be executed due to the APer indicating "Readable without authentication when discoverable" and the printer 100 being in the non-Discoverable state. In the present variant, the stop instruction, the Discoverable state, and the non-Discoverable state are examples of "setting change request", "first state", and "second state", respectively.

(Variant 13) In the above first embodiment, the OS 36 sends the Type_Req signals for the first type of PS (e.g., T142A of FIG. 8) and sends the Type_Req signals for the second type of PS (e.g., T176A of FIG. 8). Instead, the OS 36 may send the Type_Req signals only for the first type of PS, and may not send Type_Req signal for the second type of PS.

(Variant 14) The processes of T450 to T454 of FIG. 12 may not be executed. In the present variant, communication of "relation data" may not be executed.

(Variant 15) In the above third and fourth embodiments, the printer 100 changes the values indicating "Readable (or Writeable) without authentication" of the APers in the AP 1380 to the values indicating "Readable (or Writeable) with authentication". Instead, the printer 100 may change all the values indicating "Readable (or Writeable) without authentication" of the APers in the second type of PS to the values indicating "Readable (or Writeable) with authentication".

(Variant 16) The OS 36 may be Android (registered trademark), for example. In this case, T138, T142A, T142C, T176A, T176C of FIG. 8; T242C of FIG. 10; T342C, T372 of FIG. 11; T652C of FIG. 15; T756A, T756C, T790 of FIG. 17, etc. are not executed. Therefore, in the fourth embodiment, the process of T137 (also the processes of T137 to T178 of FIG. 8 cited in FIG. 16) may not be executed, for example. That is, since the OS 36 does not automatically obtain the information of the PS group in response to obtaining the connection start command, the sending of the ADV signal may not be resumed. In the present variant, the APers of the FS 138B indicate "Readable without authentication", thus the Error Response signal is not sent even when the Type_Req signal is received in T182 of FIG. 9, and the authentication communication is not executed before the function screen is displayed, for example. Then, due to the APers of the AC 138C being changed to "Readable with authentication" by T732 of FIG. 16, the authentication communication is executed (T802 to T880 of FIG. 18). In the present variant, a state where the APers of the FS 138B indicate "Readable without authentication" and a state where the APers of the AC 138C indicate "Readable with authentication" are examples of "first state" and "second state", respectively. Further, as a further variant, the APer corresponding to the Handle "n1" of the FS 138E may remain unchanged from "Readable without authentication", and the APer corresponding to the Handle "n10" of the AC 138C may remain unchanged from "Readable with authentication". Then, the processes of T722, T724, T732 of FIG. 16 may not be executed. In the this variant, "setting change request" can be omitted.

(Variant 17) In T137 of FIG. 8, the printer 100 sends the ADV signal including the connection non-allowance parameter "ADV_NONCONN_IND". Instead, the printer 100 may send an ADV signal including the connection allowance parameter "ADV_IND". In the present variant, "cause the first wireless interface to start sending a second Advertise signal" in one aspect can be omitted. Further, in the present variant, "non-allowance information" in another aspect can be omitted.

(Variant 18) In the above first and second embodiments, the OS 36 is iOS, and the authentication communication is not executed due to the sending of the ADV signal being resumed (T537 of FIG. 13 or T577 of FIG. 14) after the WFD connection button has been selected. Instead, in a case where the OS 36 is Android (registered trademark), the OS 36 does not automatically obtain the information of the PS group in response to obtaining the connection start command, and therefore the sending of the ADV signal (that is, the processes of T537 of FIG. 13 or T577 of FIG. 14) is not resumed. In this case, due to the APers of the AC 138C indicating "Readable (or Writeable) without authentication", the authentication communication is not executed. In the present variant, "without executing the communication using the specific code" is realized by the APers indicating "Readable (or Writeable) without authentication".

(Valiant 19) In the above embodiments, the printer 100 and the terminal 10 are capable of establishing both an AP connection and a WFD connection. Instead, the printer 100 and the terminal 10 may be capable of establishing either one of an AP connection or a WFD connection.

(Variant 20) The process of FIG. 15 may not be executed. In the present variant, "establish a fifth wireless connection" and "execute communication of second function execution information" in one aspect can be omitted. Further, in the present variant, "establish a fourth wireless connection" and "execute communication of second function execution information" in another aspect can be omitted.

(Variant 21) In the above first embodiment, the printer 100 changes the resume flag 162 from "ON" to "OFF" (T262 of FIG. 10) and does not resume sending the ADV signal after having stopped sending the ADV signal (T336 of FIG. 11) in order to execute the authentication communication. Instead, the printer 100 may maintain the resume flag 162 at "ON" and may start sending an ADV signal that does not include the predetermined value related to being in the Discoverable state after having stopped sending ADV signal. In this case as well, the state of the printer 100 becomes the non-Discoverable state, as a result of which the authentication communication is executed. In the present variant, a state where the ADV signal not including the predetermined value is send is an example of "second state".

(Variant 22) In the above embodiments, the printer 100 establishes the L2CAP Link (T134 of FIG. 8) and uses the established L2CAP Link to send the function information FI to the terminal 10 (T184). Instead, the printer 100 may send an ADV signal including the function information FI to the terminal 10. In this case, the processes of T130 to T180 of FIG. 8 are not executed, the processes from T182 onward may be executed in a case where the connection button in the connection confirmation screen is selected, and the function screen may be displayed by using the function information FI in the ADV signal. In the present variant, reception of the ADV signal including the function information FI is an example of "send screen display information to a terminal device via the first wireless interface without executing a target process", and the function information FI in this ADV signal is an example of "screen display information".

(Variant 23) In the above embodiments, the respective processes of FIGS. 7 to 18 are implemented by the CPU 132 of the printer 100 executing the program 136 (that is, software) and the CPU 32 of the terminal 10 executing the programs 36 and 38. Instead, one or more of the processes may be implemented by hardware such as a logic circuit.

Various aspects are disclosed as following.

One aspect of a function executing device may comprise: a first wireless interface; a processor; and a storage storing computer-readable instructions, wherein the computer-readable instructions, when executed by the processor, cause the function executing device to: send screen display information to a terminal device via the first wireless interface without executing a target process using specific authentication information that is prepared by one device among the function executing device and the terminal device, wherein the screen display information is for causing the terminal device to display a function screen indicating one or more functions that the function executing device is capable of executing; in a case where a first execution instruction for causing the function executing device to execute a first function is inputted to the terminal device after the function screen has been displayed in the terminal device, establish a first wireless connection with the terminal device via the first wireless interface; receive an execution request from the terminal device via the first wireless interface by using the first wireless connection without executing the target process using the specific authentication information, the execution request being for causing the function executing device to execute the target process using the specific authentication information; execute the target process using the specific authentication information in response to receiving the execution request from the terminal device; and after the target process using the specific authentication information has been executed, execute communication of first function execution information for executing the first function via the first wireless interface with the terminal device.

The first wireless interface may be an interface configured to execute wireless communication according to a Bluetooth (registered trademark) scheme.

The function executing device further may comprise a second wireless interface different from the first wireless interface, the first function may be a function for establishing a wireless connection via the second wireless interface with an external device, and the first function execution information may include information for establishing the wireless connection via the second wireless interface with the external device.

The one or more functions may include at least one function among a print function and a scan function, and the first function may be a function for establishing the wireless connection via the second wireless interface with the external device in order to execute communication of relation data which is related to the at least one function with the terminal device.

The first function may be at least one function among a print function and a scan function, and the first function execution information may include relation data which is related to the at least one function.

The function executing device may be configured to be set in one of a first state and a second state, wherein the first state may be a state where the function executing device is not capable of executing the target process using the specific authentication information, and the second state may be a state where the function executing device is capable of executing the target process using the specific authentication information, the screen display information may be sent to the terminal device while the function execution device is set in the first state, the execution request may be a setting change request being for setting the function executing device to the second state instead of the first state, and the target process using the specific authentication information may be executed with the terminal device after the function executing device has been set to the second state instead of the first state in response to receiving the setting change request from the terminal device.

The computer-readable instructions, when executed by the processor, further may cause the function executing device to: disconnect the first wireless connection after the setting change request has been received from the terminal device; and after the first wireless connection has been disconnected, establish a second wireless connection with the terminal device via the first wireless interface, wherein the communication of the first function execution information may be executed by using the second wireless connection.

The communication of the first function execution information may be executed by using the first wireless connection.

The first wireless interface may be an interface configured to execute wireless communication according to a Bluetooth (registered trademark) scheme, and the first state may include a state where the first wireless interface repeatedly sends an Advertise signal according to the Bluetooth scheme.

The target process using the specific authentication information may be executed in a case where a specific Read request according to the Bluetooth scheme is received from the terminal device and the first wireless interface is in a state where the first wireless interface stops sending the Advertise signal, the target process using the specific authentication information may be not executed in a case where the specific Read request is received from the terminal device and the first wireless interface repeatedly sends the Advertise signal, and in a case where the specific Read request is received from the terminal device while the function executing device is set in the first state where the first wireless interface is in a state where the first wireless interface repeatedly sends the Advertise signal, the screen display information may be sent to the terminal device without executing the target process using the specific authentication information.

The first state may include a state where the first wireless interface repeatedly sends the Advertise signal that includes non-allowing information that does not allow establishment of the wireless connection according to the Bluetooth scheme.

The target process using the specific authentication information may be executed in a case where the first wireless interface stops is in a state where the first wireless interface sending the Advertise signal, the target process using the specific authentication information may not be executed in a case where the first wireless interface is in a state where the first wireless interface repeatedly sends the Advertise signal, the second state may include a state where the first wireless interface stops sending the Advertise signal, the setting change request may be a request for causing the first wireless interface not to send the Advertise signal, the screen display information may be sent to the terminal device without executing the target process using the specific authentication information while the function executing device is set in the first state where the first wireless interface repeatedly sends the Advertise signal, and the target process using the specific authentication information may be executed while the function executing device is set in the second state where the first wireless interface stops sending the Advertise signal.

The first wireless interface may be an interface configured to execute wireless communication according to a Bluetooth (registered trademark) scheme, the first state may include a state where first setting information is stored in a memory, the first setting information may indicate a setting for, in a case where a specific Read request according to the Bluetooth scheme is received from the terminal device, sending a response for the specific Read request without executing the target process using the specific authentication information, the second state may include a state where second setting information is stored in the memory, the second setting information may indicate a setting for executing the target process using the specific authentication information in a case where the specific Read request is received from the terminal device and sending the response for the specific Read request in a case where an authentication using the specific authentication information is succeeds, the setting change request may be a request for changing the first setting information in the memory to the second setting information, in a case where the specific Read request is received from the terminal device while the first setting information is stored in the memory, the screen display information may be sent to the terminal device as the response for the specific Read request without executing the target process using the specific authentication information, and the target process using the specific authentication information may be executed in a case where the specific Read request is received from the terminal device while the second setting information is stored in the memory.

The specific authentication information may be a first code that is prepared by the one device among the function executing device and the terminal device, in a case second code is inputted in the other device among the function executing device and the terminal device after the first code has been displayed in the one device, the target process using the specific authentication information may include sending related information which is related to the second code from the other device to the one device, and in a case where the one device determines that the first code matches the second code after communication of the related information has been executed, the communication of the first function execution information may be executed with the terminal device via the first wireless interface.

The specific authentication information may be a public key that is prepared by the one device among the function executing device and the terminal device, the execution request may be a request for sending the public key from the one device to the other device among the function execution device and the terminal device, and the first function execution information bay be generated by the other device by the target process being executed using the public key.

The computer-readable instructions, when executed by the processor, further may cause the function executing device to: disconnect the first wireless connection in a case where the execution request is received from the terminal device; and after the first wireless connection has been disconnected, establish a third wireless connection with the terminal device via the first wireless interface, the communication of the first function execution information may be executed by using the third wireless connection.

The communication of the first function execution information may be executed by using the first wireless connection.

The first wireless interface may be an interface configured to execute wireless communication according to Bluetooth (registered trademark) scheme, the screen display information may be sent to the terminal device without executing either the target process using the public key which is the specific authentication information or communication using a specific code according to the Bluetooth scheme, and the target process using the public key may be executed without executing the communication using the specific code.

The communication using the specific code may not be executed in a case where the first wireless interface repeatedly sends an Advertise signal according to the Bluetooth scheme, the screen display information may be sent to the terminal device without executing the communication using the specific code while the function executing device is set in a state where the first wireless interface repeatedly sends the Advertise signal, the target process using the public key may be executed without executing the communication using the specific code while the function executing device is set in the state where the first wireless interface repeatedly sends the Advertise signal, and the communication of the first function execution information may be executed without executing the communication using the specific code while the function executing device is set in the state where the first wireless interface repeatedly sends the Advertise signal.

The computer-readable instructions, when executed by the processor, further may cause the function executing device to: in a case where a second execution instruction for causing the function executing device to execute a second function different from the first function is inputted to the terminal device after the function screen has been displayed in the terminal device, establish a fourth wireless connection with the terminal device via the first wireless interface, and execute communication of second function execution information for executing the second function with the terminal device via the first wireless interface by using the fourth wireless connection without executing the target process using the specific authentication information.

The second function may be a function of sending error display information to the terminal device, the error display information being for causing the terminal device to display error information related to an error state in a case where the function executing device is in the error state, and the communication of the second function execution information may include receiving a request for sending the error display information to the terminal device as the second function execution information from the terminal device.

One aspect of non-transitory computer-readable medium storing computer-readable instructions for a terminal device is disclosed herein. The computer-readable instructions, when executed by a processor of the terminal device, may cause the terminal device to: receive screen display information from a function executing device via a first wireless interface of the terminal device without executing a target process using specific authentication information that is prepared by one device among the function executing device and the terminal device, wherein the screen display information is for causing the terminal device to display a function screen indicating one or more functions that the function executing device is capable of executing; in a case where the screen display information is received from the function executing device, cause a display unit of the terminal device to display the function screen; in a case where a first execution instruction for causing the function executing device to execute a first function is inputted to the terminal device after the function screen has been displayed in the display unit, supply a command to an Operating System (OS) program of the terminal device, wherein the command is for establishing a first wireless connection with the function executing device via the first wireless interface; send an execution request to the function executing device via the first wireless interface by using the first wireless connection, the execution request being for causing the function executing device to execute the target process using the specific authentication information; and after the target process using the specific authentication information has been executed, execute communication of first function execution information for executing the first function via the first wireless interface with the function executing device.

The computer-readable instructions, when executed by the processor, further may cause the terminal device to: in a case where a second execution instruction for causing the function executing device to execute a second function different from the first function is inputted to the terminal device after the function screen has been displayed in the terminal device, establish a specific wireless connection with the function executing device via the first wireless interface, and execute, with the function executing device, communication of second function execution information for executing the second function via the first wireless interface by using the specific wireless connection without executing the target process using the specific authentication information.

The second function may be a function of sending error display information to the terminal device, the error display information being for causing the terminal device to display error information related to an error state in a case where the function executing device is in the error state, and the communication of the second function execution information may include receiving a request for sending the error display information to the terminal device as the second function execution information from the terminal device.

What is claimed is:

1. A function executing device comprising:
a first wireless interface;
a processor; and
a storage storing computer-readable instructions,
wherein the computer-readable instructions, when executed by the processor, cause the function executing device to:
establish a first wireless connection according to a specific scheme with a terminal device via the first wireless interface;
send screen display information to the terminal device via the first wireless interface by using the first wireless connection without executing, via the first wireless interface, communication using specific authentication information that is prepared by one device among the function executing device and the terminal device, wherein the screen display information is for causing the terminal device to display a function screen indicating one or more functions that the function executing device is capable of executing;
in a case where a first execution instruction for causing the function executing device to execute a first function is inputted to the terminal device after the function screen has been displayed in the terminal device, establish a second wireless connection according to the specific scheme with the terminal device via the first wireless interface;
execute the communication using the specific authentication information with the terminal device via the first wireless interface by using the second wireless connection; and
after the communication using the specific authentication information has been executed, execute communication of first function execution information for executing the first function via the first wireless interface with the terminal device.

2. The function executing device as in claim 1, wherein the first wireless interface is an interface configured to execute wireless communication according to Bluetooth (registered trademark) scheme.

3. The function executing device as in claim 1, wherein the function executing device further comprises a second wireless interface different from the first wireless interface,
the first function is a function for establishing a wireless connection via the second wireless interface with an external device, and
the first function execution information includes information for establishing the wireless connection via the second wireless interface with the external device.

4. The function executing device as in claim 3, wherein the one or more functions include at least one function among a print function and a scan function, and
the first function is a function for establishing the wireless connection via the second wireless interface with the external device in order to execute communication of relation data which is related to the at least one function with the terminal device.

5. The function executing device as in claim 1, wherein the first function is at least one function among a print function and a scan function, and
the first function execution information includes relation data which is related to the at least one function.

6. The function executing device as in claim 1, wherein the function executing device is configured to be set in a first state and a second state, the first state is a state where the function executing device is not capable of executing the communication using the specific authentication information, the second state is a state where the function executing device is capable of executing the communication using the specific authentication information, and the screen display information is sent to the terminal device while the function executing device is in the first state, wherein the computer-readable instructions, when executed by the processor, further cause the function executing device to:

in the case where the first execution instruction is inputted to the terminal device, receive a setting change request from the terminal device via the first wireless interface, the setting change request being for setting the function executing device to the second state instead of the first state, wherein the communication using the specific authentication information is executed with the terminal device after the function executing device has been set to the second state instead of the first state in response to receiving the setting change request from the terminal device.

7. The function executing device as in claim 6, wherein the computer-readable instructions, when executed by the processor, further cause the function executing device to:

disconnect the first wireless connection after the screen display information has been sent to the terminal device; and after the first execution instruction has been inputted to the terminal device and the first wireless connection has been disconnected, establish a third wireless connection with the terminal device via the first wireless interface, wherein the setting change request is received by using the third wireless connection, wherein the computer-readable instructions, when executed by the processor, further cause the function executing device to:

in a case where the setting change request is received from the terminal device, disconnect the third wireless connection, wherein the second wireless connection is established after the third wireless connection has been disconnected, and the communication of the first function execution information is executed by using the second wireless connection.

8. The function executing device as in claim 6, wherein the computer-readable instructions, when executed by the processor, further cause the function executing device to:

disconnect the first wireless connection after the screen display information has been sent to the terminal device, wherein the second wireless connection is established after the first wireless connection has been disconnected, the setting change request is received by using the second wireless connection, and the communication of the first function execution information is executed by using the second wireless connection.

9. The function executing device as in claim 6, wherein the first wireless interface is an interface configured to execute wireless communication according to Bluetooth (registered trademark) scheme, and the first state includes a state where the first wireless interface repeatedly sends an Advertise signal according to the Bluetooth scheme.

10. The function executing device as in claim 9, wherein the communication using the specific authentication information is executed in a case where a specific Read request according to the Bluetooth scheme is received from the terminal device and the first wireless interface is in a state where the first wireless interface stops sending the Advertise signal, the communication using the specific authentication information is not executed in a case where the specific Read request is received from the terminal device and the first wireless interface is in a state where the first wireless interface repeatedly sends the Advertise signal, and in a case where the specific Read request is received from the terminal device while the function executing device is set in the first state where the first wireless interface repeatedly sends the Advertise signal, the screen display information is sent to the terminal device without executing the communication using the specific authentication information.

11. The function executing device as in claim 10, wherein the first wireless connection is established with the terminal device in a case where a first Advertise signal is received by the terminal device, and the first Advertise signal includes allowance information that allows establishment of a wireless connection according to the Bluetooth scheme, wherein the computer-readable instructions, when executed by the processor, further cause the function executing device to:

in a case where the first wireless connection is established with the terminal device, cause the first wireless interface to stop sending the first Advertise signal; and after the sending of the first Advertise signal has been stopped, cause the first wireless interface to start sending a second Advertise signal, the second Advertise signal including non-allowance information that does not allow establishment of the wireless connection according to the Bluetooth scheme, wherein the first state includes a state where the first wireless interface repeatedly sends the second Advertise signal.

12. The function executing device as in claim 9, wherein the communication using the specific authentication information is executed in a case where the first wireless interface is in a state where the first wireless interface stops sending the Advertise signal, the communication using the specific authentication information is not executed in a case where the first wireless interface is in a state where the first wireless interface repeatedly sends the Advertise signal, the second state includes a state where the first wireless interface stops sending the Advertise signal, the setting change request is a request for causing the first wireless interface not to send the Advertise signal, the screen display information is sent to the terminal device without executing the communication using the specific authentication information while the function executing device is set in the first state where the first wireless interface repeatedly sends the Advertise signal, and the communication using the specific authentication information is executed while the function executing device is set in the second state where the first wireless interface stops sending the Advertise signal.

13. The function executing device as in claim 6, wherein
the first wireless interface is an interface configured to execute wireless communication according to Bluetooth (registered trademark) scheme,
the first state includes a state where first setting information is stored in a memory,
the first setting information indicates a setting for, in a case where a specific Read request according to the Bluetooth scheme is received from the terminal device, sending a response for the specific Read request without executing the communication using the specific authentication information,
the second state includes a state where second setting information is stored in the memory,
the second setting information indicates a setting for executing the communication using the specific authentication information in a case where the specific Read request is received from the terminal device and sending the response for the specific Read request in a case where authentication using the specific authentication information succeeds,
the setting change request is a request for changing the first setting information in the memory to the second setting information,
in a case where the specific Read request is received from the terminal device while the first setting information is stored in the memory, the screen display information is sent to the terminal device as the response for the specific Read request without executing the communication using the specific authentication information, and
the communication using the specific authentication information is executed in a case where the specific Read request is received from the terminal device while the second setting information is stored in the memory.

14. The function executing device as in claim 1, wherein
the specific authentication information is a first code that is prepared by the one device among the function executing device and the terminal device,
in a case where a second code is inputted to the other device among the function executing device and the terminal device after the first code has been displayed in the one device, the communication using the specific authentication information includes sending related information which is related to the second code from the other device to the one device, and
in a case where the one device determines that the first code matches the second code after communication of the related information has been executed, the communication of the first function execution information is executed with the terminal device via the first wireless interface.

15. The function executing device as in claim 1, wherein
the specific authentication information is a public key that is prepared by the one device among the function executing device and the terminal device,
the communication using the specific authentication information includes sending the public key from the one device to the other device among the function executing device and the terminal device, and
the first function execution information is generated by the other device by using the public key.

16. The function executing device as in claim 15, wherein
the computer-readable instructions, when executed by the processor, further cause the function executing device to:
disconnect the first wireless connection after the screen display information has been sent to the terminal device,
wherein the second wireless connection is established after the first wireless connection has been disconnected,
wherein the computer-readable instructions, when executed by the processor, further cause the function executing device to:
disconnect the second wireless connection after communication of the public key is executed with the terminal device by using the second wireless connection; and
after the second wireless connection has been disconnected, establish a third wireless connection with the terminal device via the first wireless interface,
wherein the communication of the first function execution information is executed by using the third wireless connection.

17. The function executing device as in claim 15, wherein
the computer-readable instructions, when executed by the processor, further cause the function executing device to:
disconnect the first wireless connection after the screen display information has been sent to the terminal device,
wherein the second wireless connection is established after the first wireless connection has been disconnected, and
the communication of the first function execution information is executed by using the second wireless connection.

18. The function execution device as in claim 15, wherein
the first wireless interface is an interface configured to execute wireless communication according to Bluetooth (registered trademark) scheme,
the screen display information is sent to the terminal device without executing either the communication using the public key which is the specific authentication information or communication using a specific code according to the Bluetooth scheme, and
the communication using the public key is executed without executing the communication using the specific code.

19. The function executing device as in claim 18, wherein
the communication using the specific code is not executed in a case where the first wireless interface repeatedly sends an Advertise signal according to the Bluetooth scheme,
the screen display information is sent to the terminal device without executing the communication using the specific code while the function executing device is set in a state where the first wireless interface repeatedly sends the Advertise signal,
the communication using the public key is executed without executing the communication using the specific code while the function executing device is set in the state where the first wireless interface repeatedly sends the Advertise signal, and
the communication of the first function execution information is executed without executing the communication using the specific code while the function executing device is set in the state where the first wireless interface repeatedly sends the Advertise signal.

20. The function executing device as in claim 1, wherein the computer-readable instructions, when executed by the processor, further cause the function executing device to:

in a case where a second execution instruction for causing the function executing device to execute a second function different from the first function is inputted to the terminal device after the function screen has been displayed in the terminal device, establish a third wireless connection with the terminal device via the first wireless interface, and execute communication of second function execution information for executing the second function with the terminal device via the first wireless interface by using the fifth third wireless connection without executing the communication using the specific authentication information via the first wireless interface by using the third wireless connection.

21. The function executing device as in claim 20, wherein the second function is a function of sending error display information to the terminal device, the error display information being for causing the terminal device to display error information related to an error state in a case where the function executing device is in the error state, and the communication of the second function execution information includes receiving a request for sending the error display information to the terminal device as the second function execution information from the terminal device.

22. A non-transitory computer-readable medium storing computer-readable instructions for a terminal device, the computer-readable instructions, when executed by a processor of the terminal device, causing the terminal device to:

supply a first command to an Operating System (OS) program of the terminal device, the first command being for establishing a first wireless connection according to a specific scheme with a function executing device via a first wireless interface of the terminal device;

receive screen display information from the function executing device via the first wireless interface by using the first wireless connection without executing, via the first wireless interface, communication using specific authentication information prepared by one device among the function executing device and the terminal device, wherein the screen display information is for causing the terminal device to display a function screen indicating one or more functions that the function executing device is capable of executing;

in a case where the screen display information is received from the function executing device, cause a display unit of the terminal device to display the function screen;

in a case where a first execution instruction for causing the function executing device to execute a first function is inputted to the terminal device after the function screen has been displayed in the display unit, supply a second command to the OS program, the second command being for establishing a second wireless connection according to the specific scheme with the function executing device via the first wireless interface; and after the communication using the specific authentication information has been executed with the function executing device via the first wireless interface by using the second wireless connection, execute communication of first function execution information for executing the first function via the first wireless interface with the function executing device.

23. The non-transitory computer-readable medium as in claim 22, wherein the computer-readable instructions, when executed by the processor, further cause the terminal device to:

in a case where a second execution instruction for causing the function executing device to execute a second function different from the first function is inputted to the terminal device after the function screen has been displayed in the terminal device, establish a specific wireless connection with the function executing device via the first wireless interface, and execute, with the function executing device, communication of second function execution information for executing the second function via the first wireless interface by using the specific wireless connection without executing the communication using the specific authentication information via the first wireless interface by using the specific wireless connection.

24. The non-transitory computer-readable medium as in claim 23, wherein the second function is a function of sending error display information to the terminal device, the error display information being for causing the terminal device to display error information related to an error state in a case where the function executing device is the error state, and the communication of the second function execution information includes receiving a request for sending the error display information to the terminal device as the second function execution information from the terminal device.

* * * * *